US012715498B2

(12) United States Patent
Iwatani et al.

(10) Patent No.: US 12,715,498 B2
(45) Date of Patent: Aug. 25, 2026

(54) TURNING CONTROL DEVICE AND TURNING DEVICE

(71) Applicant: NSK STEERING & CONTROL, INC., Tokyo (JP)

(72) Inventors: Atsushi Iwatani, Maebashi (JP); Tetsuya Kitazume, Maebashi (JP); Shoya Maruyama, Maebashi (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/111,055

(22) PCT Filed: Jun. 14, 2024

(86) PCT No.: PCT/JP2024/021687
§ 371 (c)(1),
(2) Date: Mar. 12, 2025

(87) PCT Pub. No.: WO2025/022860
PCT Pub. Date: Jan. 30, 2025

(65) Prior Publication Data

US 2025/0263116 A1 Aug. 21, 2025

(30) Foreign Application Priority Data

Jul. 26, 2023 (JP) ................................ 2023-121872

(51) Int. Cl.
*B62D 5/04* (2006.01)
*B62D 15/02* (2006.01)

(52) U.S. Cl.
CPC ......... *B62D 5/0481* (2013.01); *B62D 5/0469* (2013.01); *B62D 15/021* (2013.01)

(58) Field of Classification Search
None
See application file for complete search history.

(56) References Cited

U.S. PATENT DOCUMENTS

2017/0240201 A1* 8/2017 Kim ......................... B62D 6/10
2017/0274929 A1* 9/2017 Sasaki ...................... B62D 5/04
(Continued)

FOREIGN PATENT DOCUMENTS

JP 2021-049939 A 4/2021
JP 7131737 B1 9/2022
(Continued)

OTHER PUBLICATIONS

International Search Report for PCT/JP2024/021687 dated Sep. 3, 2024.
Written Opinion for PCT/JP2024/021687 dated Sep. 3, 2024.

*Primary Examiner* — Adam D Tissot
*Assistant Examiner* — Laura E Linhardt
(74) *Attorney, Agent, or Firm* — Sughrue Mion, PLLC

(57) ABSTRACT

A turning control device includes: a terminal position learning unit configured to learn a terminal position of the turning mechanism, based on a steered position of a turning mechanism detected by the position detection unit; and a relearning determination unit configured to determine necessity of relearning of the terminal position. The relearning determination unit includes: an end-abutting detection unit configured to detect occurrence of end-abutting, and acquire an end-abutting steering angle that is a steering angle when end-abutting is occurred; an end-abutting steering angle range determination unit configured to determine whether or not variation in the end-abutting steering angles acquired multiple times is less than or equal to a predetermined threshold value; and a relearning unit configured to, when the variation is less than or equal to the predetermined threshold value, reset the learned terminal position to an initial value.

9 Claims, 15 Drawing Sheets

(56) References Cited

U.S. PATENT DOCUMENTS

| | | | | |
|---|---|---|---|---|
| 2018/0057047 | A1* | 3/2018 | Toko | G01P 1/026 |
| 2018/0257704 | A1* | 9/2018 | Minaki | B62D 5/0463 |
| 2019/0135335 | A1* | 5/2019 | Itamoto | B62D 5/0469 |
| 2020/0346687 | A1 | 11/2020 | Sakaguchi et al. | |
| 2021/0094610 | A1 | 4/2021 | Yamaguchi et al. | |
| 2021/0197889 | A1 | 7/2021 | Yamaguchi et al. | |
| 2022/0048558 | A1 | 2/2022 | Christian, Jr. et al. | |
| 2023/0117916 | A1 | 4/2023 | Kitazume | |
| 2023/0120193 | A1 | 4/2023 | Kitazume et al. | |

FOREIGN PATENT DOCUMENTS

| | | | |
|---|---|---|---|
| JP | 7136398 | B1 | 9/2022 |
| WO | 2019/102543 | A1 | 5/2019 |

* cited by examiner

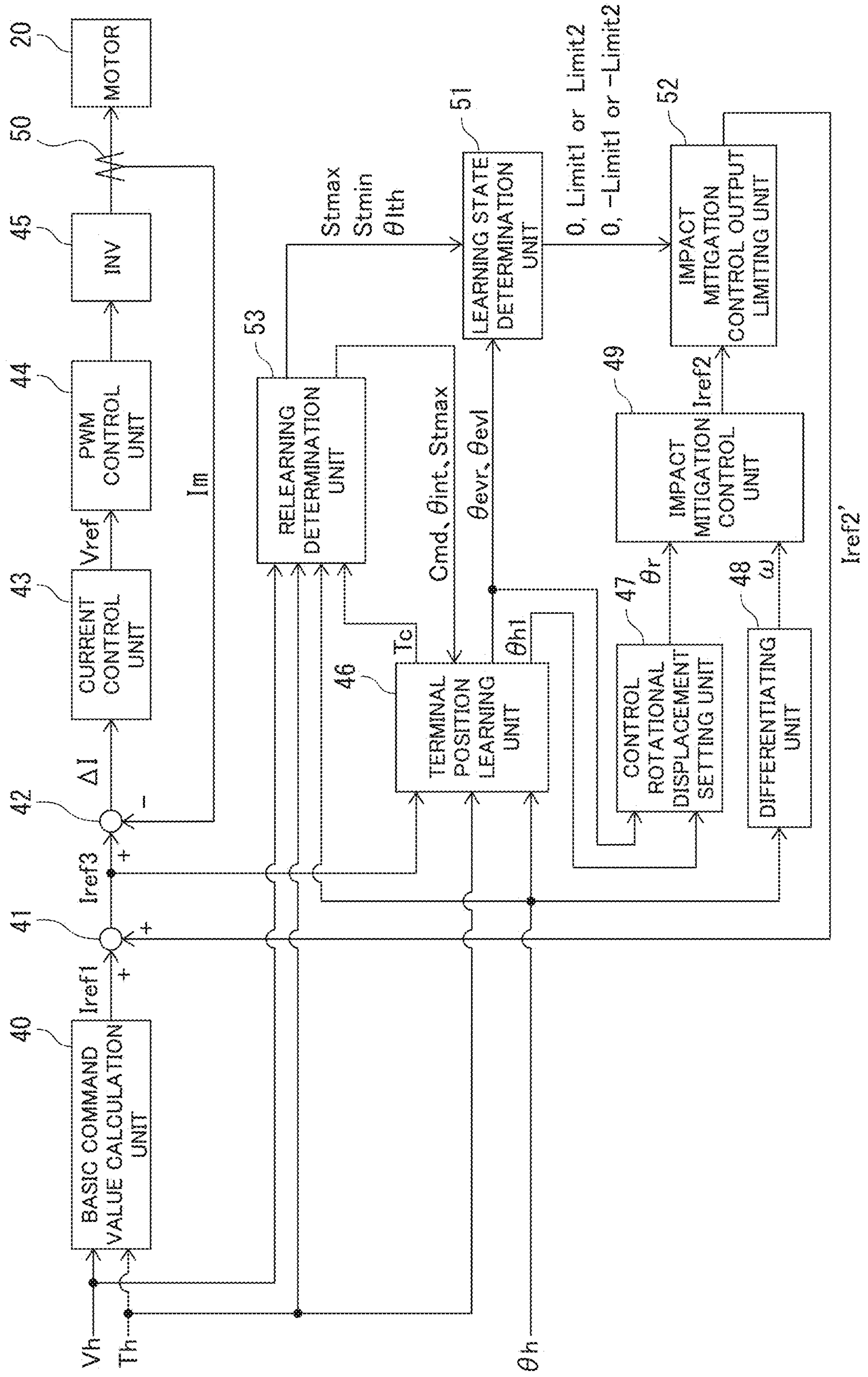

FIG. 2

20 MOTOR
50
45 INV
44 PWM CONTROL UNIT
43 CURRENT CONTROL UNIT
Vref
Im
42
ΔI
41
Iref3
Iref1
40 BASIC COMMAND VALUE CALCULATION UNIT
Vh
Th
θh
53 RELEARNING DETERMINATION UNIT
Stmax
Stmin
θlth
51 LEARNING STATE DETERMINATION UNIT
0, Limit1 or Limit2
0, −Limit1 or −Limit2
52 IMPACT MITIGATION CONTROL OUTPUT LIMITING UNIT
Cmd, θint, Stmax
θevr, θevl
49 IMPACT MITIGATION CONTROL UNIT
Iref2
Iref2'
46 TERMINAL POSITION LEARNING UNIT
Tc
θh1
47 CONTROL ROTATIONAL DISPLACEMENT SETTING UNIT
θr
48 DIFFERENTIATING UNIT
ω

46
TERMINAL POSITION LEARNING UNIT
θh
Th
Iref3
Cmd
θint
Stmax
82
+
−
CORRECTED POSITION CALCULATION UNIT
75
Z⁻¹
77
SECOND STORAGE UNIT
76
θm2
THIRD STORAGE UNIT
78
θo
LIMITER
79
θh1
θevr
θevl
71
θm1'
FIRST STORAGE UNIT
72
θm1
RATE LIMITER
74
θo
TERMINAL POSITION CORRECTION UNIT
83
OUTPUT SHAFT TORQUE CALCULATION UNIT
70
Tc
Z⁻¹
73
Ofs
OFFSET ERROR CALCULATION UNIT
81
St
STROKE CALCULATION UNIT
80
Ofs
Tc ACTUAL RACK END
RACK NEUTRAL POSITION
ACTUAL RACK END
θevl
0[deg]
θevr
θint
θint
θevl
0[deg]
θevr
θlth
θevl
0[deg]
θevr
θlth
St
RACK STROKE MINIMUM VALUE
θevl
0[deg]
θevr
St
RACK STROKE MINIMUM VALUE
θevl
0[deg]
θevr
St

ACTUAL RACK END
RACK NEUTRAL POSITION
ACTUAL RACK END

θevl
0[deg]
θevr

θevl
0[deg]
θevr
Δθ

θevl
0[deg]
θevr
0fs
0fs
RACK STROKE MAXIMUM VALUE
θlth
θlth

θevl
0[deg]
0fs
θevr
RACK STROKE MINIMUM VALUE
Δθevl

θevl
0[deg]
Δθevl
θevr
RACK STROKE MINIMUM VALUE

θevl
0[deg]
θevr

θevl
0[deg]
θevr
RACK STROKE MINIMUM VALUE

FIG. 10

| STATE | UPPER LIMIT | LOWER LIMIT |
|---|---|---|
| FIG. 8B | 0 | 0 |
| FIG. 8C | 0 | −Limit1 |
| FIG. 8D | Limit1 | −Limit1 |
| FIG. 8E | Limit2 | −Limit2 |
| FIG. 8F, FIG. 9B | Limit2 | −Limit2 |
| FIG. 9C | Limit2 | −Limit2 |
| FIG. 9D | 0 | 0 |
| FIG. 9E | Limit1 | 0 |
| FIG. 9F | Limit1 | 0 |
| FIG. 9G | Limit2 | −Limit2 |
| FIG. 9H | Limit2 | −Limit2 |

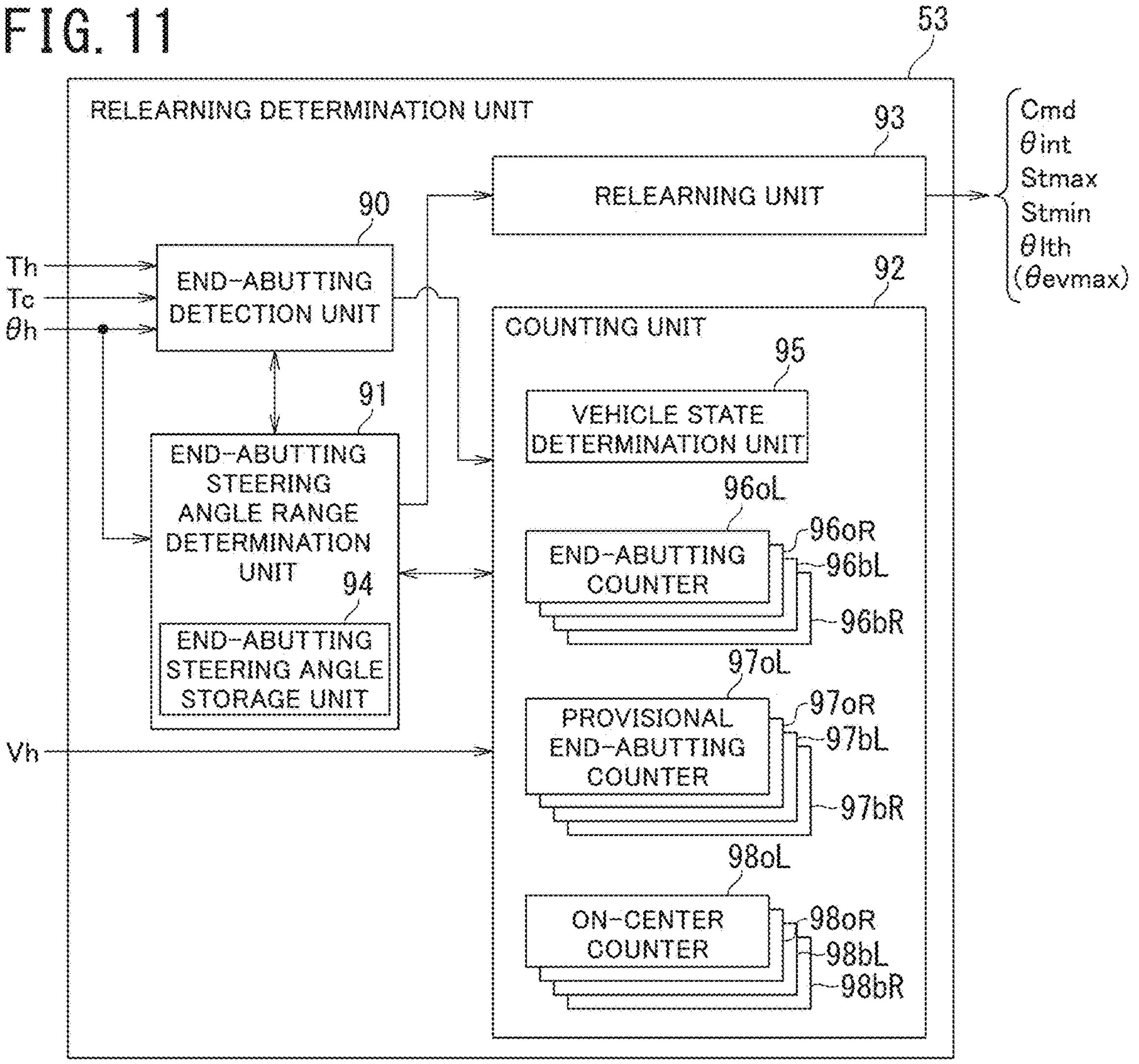

FIG. 11

53
RELEARNING DETERMINATION UNIT
93
RELEARNING UNIT
Cmd
θint
Stmax
Stmin
θlth
(θevmax)
90
Th
Tc
θh
END-ABUTTING DETECTION UNIT
92
COUNTING UNIT
95
VEHICLE STATE DETERMINATION UNIT
91
END-ABUTTING STEERING ANGLE RANGE DETERMINATION UNIT
94
END-ABUTTING STEERING ANGLE STORAGE UNIT
96oL
96oR
96bL
96bR
END-ABUTTING COUNTER
97oL
97oR
97bL
97bR
PROVISIONAL END-ABUTTING COUNTER
Vh
98oL
98oR
98bL
98bR
ON-CENTER COUNTER

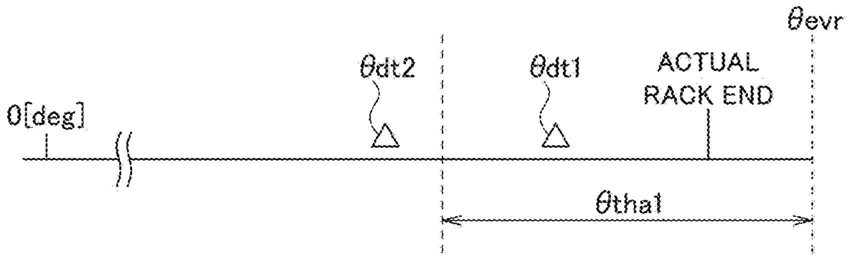

FIG. 12A

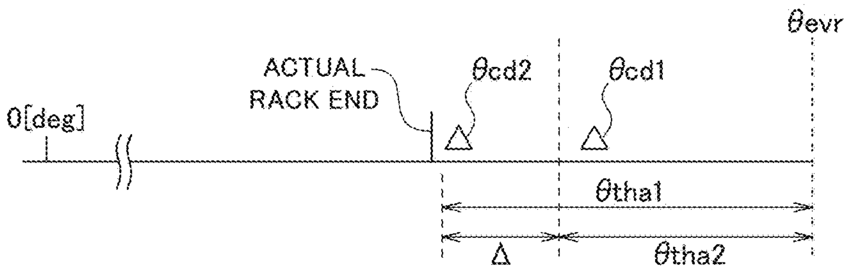

FIG. 12B

TURNING CONTROL DEVICE AND TURNING DEVICE

CROSS REFERENCE TO RELATED APPLICATIONS

This application is a National Stage of International Application No. PCT/JP2024/021687 filed Jun. 14, 2024, claiming priority based on Japanese Patent Application No. 2023-121872 filed Jul. 26, 2023.

TECHNICAL FIELD

The present invention relates to a turning control device and a turning device.

BACKGROUND ART

In a turning mechanism of a vehicle, when a turning angle increases and reaches a maximum mechanical turning angle, a rack shaft of the turning mechanism reaches a stroke end and it becomes impossible to increase the turning angle any further. The rack shaft being brought to a state of having reached a stroke end as described above is referred to as "end-abutting". In addition, a stroke end of the rack shaft is sometimes referred to as "rack end".

When end-abutting occurs at a high turning velocity, there is a risk that large impact and hit sound (abnormal noise) are generated and the driver feels uncomfortable. In PTLs 1 and 2, technologies for mitigating impact at the time of end-abutting by learning a maximum value of an absolute value of a steering angle as rack end positions and preventing increase in a steering angle when the steering angle detected by a sensor is in a vicinity of one of the learned rack end positions are described.

Hereinafter, a virtual rack end position learned based on a steering angle detected by the sensor is sometimes referred to as "virtual rack end position", and an actual physical rack end position is sometimes referred to as "actual rack end position".

CITATION LIST

Patent Literature

PTL 1: JP 7131737 B
PTL 2: JP 7136398 B

SUMMARY OF INVENTION

Technical Problem

There are some cases where after virtual rack end positions are learned, a rack shaft is replaced. On this occasion, it is conceivable that a rack shaft having a length different from length of a rack shaft that should be originally mounted is mistakenly mounted or a mounting position of a rack shaft changes between before and after replacement of the rack shaft. In such a case, it is necessary to relearn the virtual rack end positions. There is a risk that when the virtual rack end positions are relearned, an inappropriate virtual rack end position is learned due to a reason such as rapid turning-back steering and collision of a tire with a curb.

The present invention has been made in consideration of the above-described problem, and an object of the present invention is to prevent incorrect learning at the time of relearning of a rack end position.

Solution to Problem

In order to achieve the above-described object, according to an aspect of the present invention, there is provided a turning control device including: a position detection unit configured to detect a steered position of a turning mechanism of a vehicle; a terminal position learning unit configured to learn a terminal position of the turning mechanism, based on the steered position detected by the position detection unit; and a relearning determination unit configured to determine necessity of relearning of the terminal position, wherein the relearning determination unit includes: an end-abutting detection unit configured to detect occurrence of end-abutting, the end-abutting being a state in which the turning mechanism is turned to the terminal position, and acquire an end-abutting steering angle, the end-abutting steering angle being a steering angle when occurrence of end-abutting is detected; an end-abutting steering angle range determination unit configured to determine whether or not variation in the end-abutting steering angles acquired multiple times is less than or equal to a predetermined threshold value; and a relearning unit configured to, when the variation is less than or equal to the predetermined threshold value, reset the learned terminal position to an initial value.

According to another aspect of the present invention, there is provided a turning device including: the turning control device described above; and an actuator configured to, drive-controlled by the turning control device, turn a steered wheel of the vehicle.

Advantageous Effects of Invention

According to the present invention, it is possible to prevent incorrect learning at the time of relearning of a rack end position.

BRIEF DESCRIPTION OF DRAWINGS

FIG. 2 is a block diagram illustrative of an example of a functional configuration of a controller illustrated in FIG. 1;

FIG. 10 is a table illustrative of an example of limiting values in the states in FIGS. 8B to 8F and FIGS. 9B to 9H;

FIG. 11 is a block diagram illustrative of an example of a functional configuration of a relearning determination unit;

FIGS. 12A and 12B are an explanatory diagram of an example of end-abutting steering angle necessity determination and an explanatory diagram of an example of end-abutting steering angle acquisition possibility determination, respectively;

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
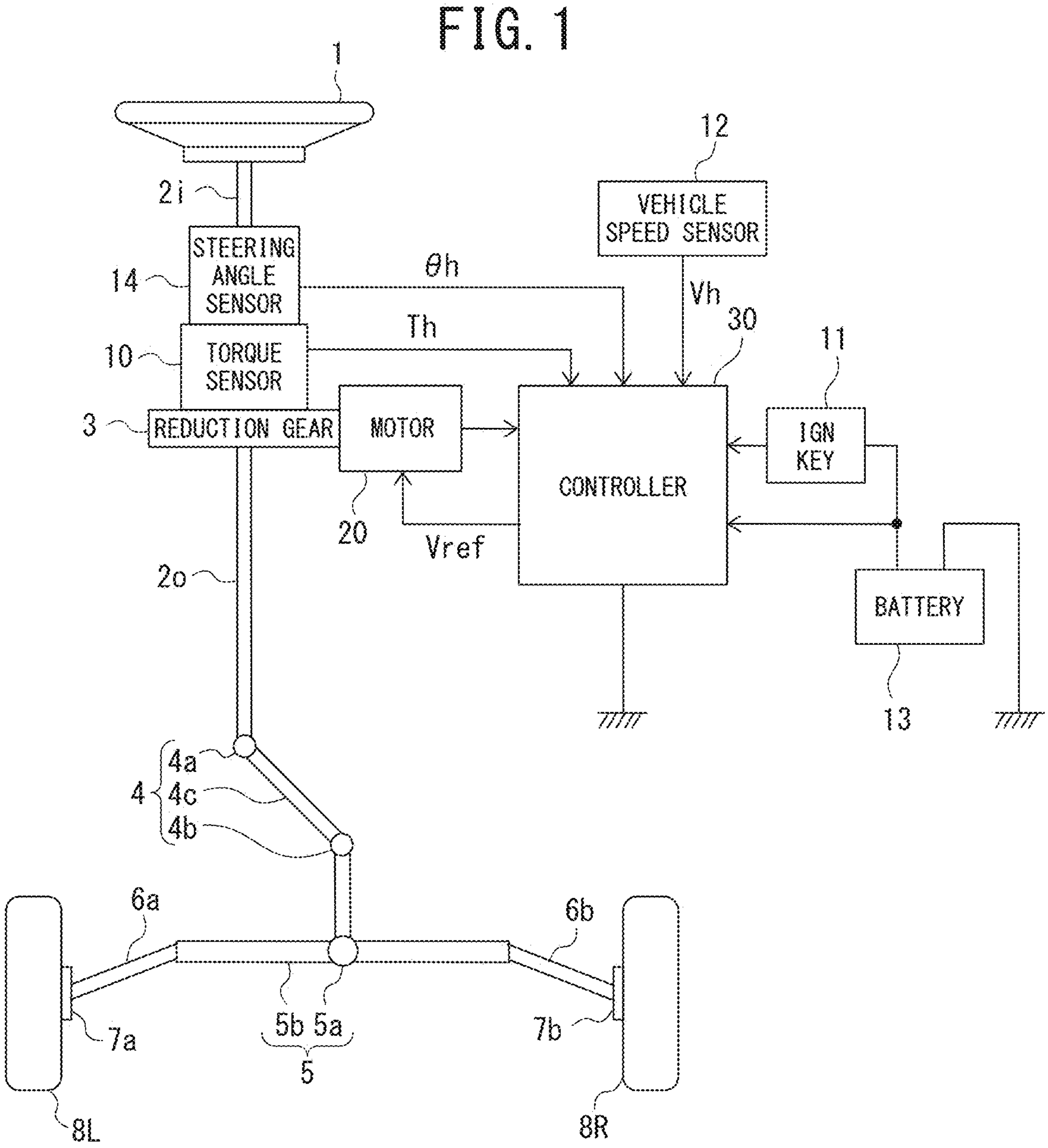
FIG. 1 is a configuration diagram illustrative of an outline of an example of an electric power steering device of an embodiment.

FIG. 1 is a configuration diagram illustrative of an outline of an example of an electric power steering device of an embodiment. Column shafts (steering shafts) 2*i* and 20 of a steering wheel 1 is connected to steered wheels 8L and 8R by way of a reduction gear (worm gear) 3, which constitutes a speed reduction mechanism, an intermediate shaft 4, a pinion rack mechanism 5, and tie rods 6*a* and 6*b* and further via hub units 7*a* and 7*b*.

The column input shaft 21 and the column output shaft 20 are connected by a torsion bar (not illustrated) that is twisted due to a difference in rotation angles between the column input shaft 2*i* and the column output shaft 20.

The intermediate shaft 4 includes a shaft member 4*c* and universal joints 4*a* and 4*b* that are attached to both ends of the shaft member. The universal joint 4*a* is coupled to the column output shaft 20, and the universal joint 4*b* is coupled to the pinion rack mechanism 5.

The pinion rack mechanism 5 includes a pinion 5*a* that is coupled to a pinion shaft to which steering force is transmitted from the universal joint 4*b* and a rack 5*b* that meshes with the pinion 5*a*, and converts rotational motion transmitted to the pinion 5*a* to linear motion in the vehicle width direction by the rack 5*b*.

To the steering shaft 2 (column shafts 2*i* and 2*o*), a torque sensor 10 configured to detect steering torque Th is disposed. To the steering shaft 2 (column shafts 2*i* and 2*o*), a steering angle sensor 14 configured to detect a steering angle θh of the steering wheel 1 is also disposed.

A motor 20 configured to assist steering force of the steering wheel 1 is also connected to the column output shaft 2*o* via the reduction gear 3. To a controller 30 configured to control the electric power steering (EPS) device, power is supplied from a battery 13 and an ignition key signal is also input via an ignition (IGN) key 11.

Note that a means for providing steering assist force is not limited to a motor and a variety of types of actuators can be used.

The controller 30 performs calculation of a current command value of an assist control command, based on steering torque Th detected by the torque sensor 10, vehicle speed Vh detected by a vehicle speed sensor 12, and a steering angle θh detected by the steering angle sensor 14 and controls current to be supplied to the motor 20 by a voltage control command value Vref obtained by performing compensation and the like on the calculated current command value.

Note that the steering angle sensor 14 is not an essential component and the steering angle θh may be calculated by adding a torsion angle of a torsion bar in the torque sensor 10 to a rotation angle obtained from a rotation angle sensor configured to detect a rotation angle of the rotation shaft of the motor 20.

The controller 30 may include, for example, a computer including a processor and peripheral components, such as a storage device. The processor may be, for example, a central processing unit (CPU) or a micro-processing unit (MPU).

The storage device may include any one of a semiconductor storage device, a magnetic storage device, and an optical storage device. The storage device may include registers, a cache memory, or a memory, such as a read only memory (ROM) and a random access memory (RAM), that is used as a main storage device.

Functions of the controller 30, which will be described below, are achieved by, for example, the processor of the controller 30 executing computer programs stored in the storage device.

Note that the controller 30 may be formed by use of dedicated hardware for performing respective units of information processing, which will be described below. For example, the controller 30 may include functional logic circuits that are set in a general-purpose semiconductor integrated circuit. For example, the controller 30 may have a programmable logic device (PLD), such as a field-programmable gate array (FPGA), or the like.

FIG. 2 is a block diagram illustrative of an example of a functional configuration of the controller 30 of the embodiment. The controller 30 includes a basic command value calculation unit 40, an adder 41, a subtracter 42, a current control unit 43, a pulse width modulation (PWM) control unit 44, an inverter (INV) 45, a terminal position learning unit 46, a control rotational displacement setting unit 47, a differentiating unit 48, an impact mitigation control unit 49, a current detector 50, a learning state determination unit 51, an impact mitigation control output limiting unit 52, and a relearning determination unit 53.

The basic command value calculation unit 40 calculates a basic current command value Iref1 that is a control target value of driving current of the motor 20, based on the steering torque Th from the torque sensor 10 and the vehicle speed Vh from the vehicle speed sensor 12.

In the present embodiment, a value of the basic current command value Iref1 that causes a steering assist force of the motor 20 to be generated in the rightward steering direction is defined as a positive value, and a value of a basic current command value Iref1 that causes a steering assist force to be generated in the leftward steering direction is defined as a negative value.

The adder 41 corrects the basic current command value Iref1 by adding impact mitigation control output Iref2' output from the impact mitigation control output limiting unit 52 to the basic current command value Iref1 and outputs the basic current command value Iref1 after correction as a current command value Iref3.

The impact mitigation control output limiting unit 52 sets the impact mitigation control output Iref2' by limiting an upper limit of impact mitigation control output Iref2 output from the impact mitigation control unit 49 by a limiting value 0, Limit1, or Limit2 output from the learning state determination unit 51 and limiting a lower limit of the impact mitigation control output Iref2 by a limiting value 0, −Limit1, or −Limit2 output from the learning state determination unit 51.

The impact mitigation control unit 49 mitigates impact and hit sound (abnormal noise) due to end-abutting by suppressing increase in the steering angle θh when the steering angle θh comes close to a rack end position. Control performed by the impact mitigation control unit 49 to mitigate impact and abnormal noise due to end-abutting is sometimes referred to as "impact mitigation control".

The impact mitigation control unit 49 outputs a current command value to suppress increase in the steering angle θh in order to mitigate impact and hit sound due to end-abutting, as the impact mitigation control output Iref2. The impact mitigation control output Iref2 at the time of rightward steering has a negative value and reduces the magnitude of the positive basic current command value Iref1. On the other hand, the impact mitigation control output Iref2 at the time of leftward steering has a positive value and reduces the magnitude of the negative basic current command value Iref1. For example, the impact mitigation control unit 49 may output a current command value to generate a steering reaction force.

The impact mitigation control output limiting unit 52 limits the upper limit of the impact mitigation control output Iref2 at the time of leftward steering to a limiting value 0 or a positive limiting value Limit1 or Limit2 output from the learning state determination unit 51 and limits the lower limit of the impact mitigation control output Iref2 at the time of rightward steering to a limiting value 0 or a negative limiting value −Limit1 or −Limit2 output from the learning state determination unit 51.

Details of the impact mitigation control unit 49, the learning state determination unit 51, and the relearning determination unit 53 will be described later.

The current command value Iref3 that the adder 41 calculated is input to the subtracter 42, and deviation Iref3-Im of the current command value Iref3 from a fed-back motor current value Im is calculated. The deviation Iref3-Im is controlled by the current control unit 43 configured to perform PI control or the like, a current-controlled voltage control value Vref is input to the PWM control unit 44 and a duty cycle is calculated therein, and a PWM signal PWM-drives the motor 20 via the inverter 45. The motor current value Im of the motor 20 is detected by the current detector 50, and input to the subtracter 42 and thereby fed back.

The terminal position learning unit 46 learns, based on the steering angle θh detected by the steering angle sensor 14, virtual rack end positions θevr and θevl that are terminal positions of a turning mechanism. θevr denotes a virtual rack end position at the time of rightward steering and has a positive value. θevl denotes a virtual rack end position at the time of leftward steering and has a negative value.

Further, error sometimes occurs between a central position between right and left actual rack end positions (hereinafter, sometimes referred to as "rack neutral position") and a neutral position of the steering angle θh of the column shaft detected by the steering angle sensor 14 (hereinafter, sometimes referred to as "steering angle neutral position"). Hereinafter, such error is sometime referred to as "offset error".

The offset error occurs due to reasons such as incorrect assembly of the intermediate shaft 4. The terminal position learning unit 46 estimates offset error Ofs and outputs a corrected steering angle θh1 to which the steering angle θh detected by the steering angle sensor 14 is corrected by subtracting the offset error Ofs from the steering angle θh. Details of the terminal position learning unit 46 will be described later.

The control rotational displacement setting unit 47 sets control rotational displacement θr that indicates how close the corrected steering angle θh1 is to one of the virtual rack end positions θevr and θevl when the corrected steering angle θ*h*1 comes close to a rack end position and is within a range where the impact mitigation control is executed (hereinafter, sometimes referred to as "impact mitigation control execution range").

Figure 3:
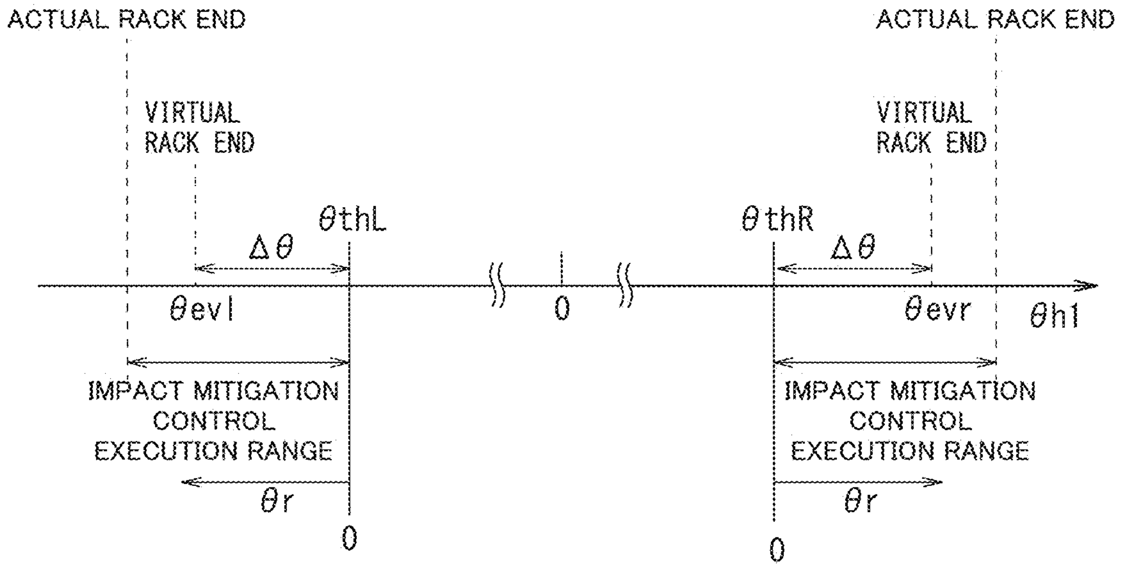
FIG. 3 is an explanatory diagram of an example of a steering angle range where impact mitigation control is performed.

FIG. 3 is now referred to. In the case of the rightward steering (that is, in the case where the corrected steering angle θh1 is a positive value), a range where the corrected steering angle θh1 is greater than a threshold value θthR is the impact mitigation control execution range, and in the case of the leftward steering (that is, in the case where the corrected steering angle θ*h*1 is a negative value), a range where the corrected steering angle θh1 is less than a threshold value θthL is the impact mitigation control execution range.

The threshold values θthR and θthL are set based on the virtual rack end positions θevr and θevl, respectively. For example, the threshold value θthR for the rightward steering may be a value θevr-Δθ obtained by subtracting a positive predetermined value Δθ from the virtual rack end position θevr, and the threshold value θthL for the leftward steering may be a value θevl+Δθ obtained by adding the predetermined value Δθ to the virtual rack end position θevl.

The control rotational displacement θr is, for example, set to zero ("0") outside the impact mitigation control execution range (that is, θthL≤θh1≤θthR), and, within the impact mitigation control execution range for the rightward steering, the larger a difference θh1−θthR obtained by subtracting the threshold value θthR from the corrected steering angle θ*h*1 becomes, the larger the control rotational displacement θr is set. In contrast, within the impact mitigation control execution range for the leftward steering, the smaller a difference θ*h*1−θthL obtained by subtracting the threshold value θthL from the corrected steering angle θ*h*1 becomes (that is, the larger an absolute value |θ*h*1−θthL| becomes), the smaller the negative control rotational displacement θr may be set (that is, an absolute value |θ*r*| becomes larger).

In other words, in a range where the corrected steering angle θ*h*1 is greater than the threshold value θthR, the positive control rotational displacement Or increases in accordance with increase in the corrected steering angle θ*h*1, and, in a range where the corrected steering angle θh1 is less than the threshold value θthL, the negative control rotational displacement θr decreases in accordance with decrease in the corrected steering angle θ*h*1.

For example, the control rotational displacement setting unit 47 may set a difference θh1−θthR as the control rotational displacement θr when the corrected steering angle θ*h*1 is greater than the threshold value θthR, and may set a difference θh1−θthL as the control rotational displacement θr when the corrected steering angle θh1 is less than the threshold value θthL.

FIG. 2 is now referred to. The differentiating unit 48 differentiates the steering angle θh detected by the steering angle sensor 14 and thereby calculates steering angular velocity ω.

The impact mitigation control unit 49 sets the impact mitigation control output Iref2, based on the control rotational displacement θr and the steering angular velocity ω.

Figure 4:
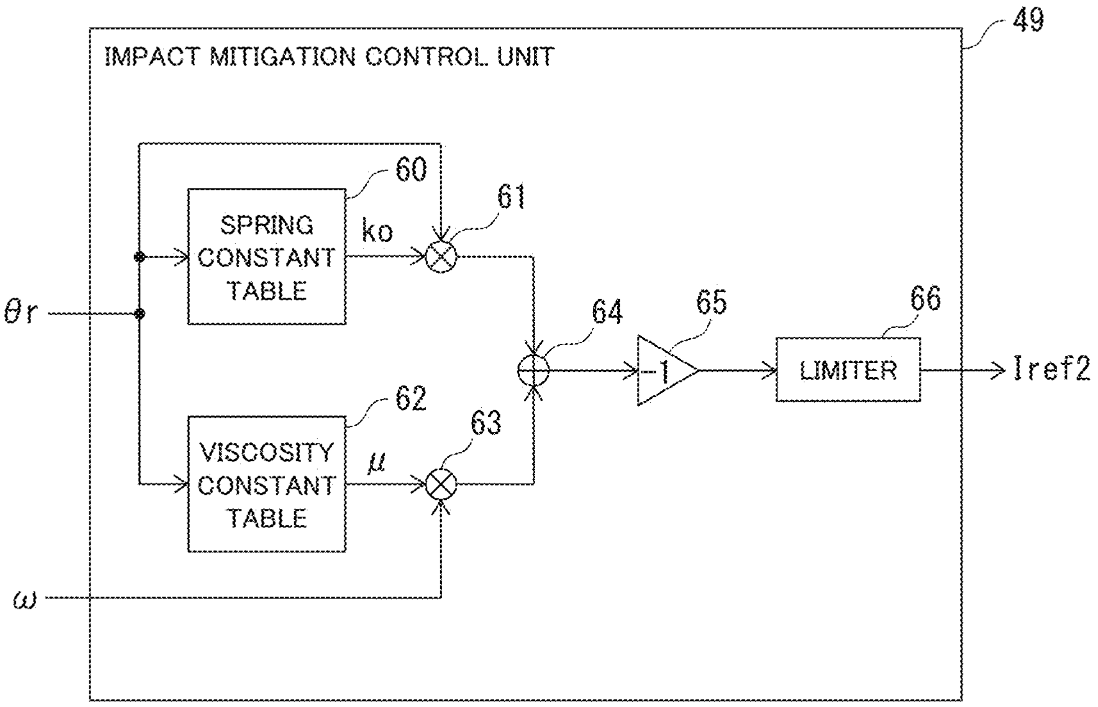
FIG. 4 is a block diagram illustrative of an example of a functional configuration of an impact mitigation control unit.

FIG. 4 is a block diagram illustrative of an example of a functional configuration of the impact mitigation control unit 49. The impact mitigation control unit 49 includes a spring constant table 60, multipliers 61 and 63, a viscosity constant table 62, an adder 64, an inverter 65, and a limiter 66.

Figure 5A:
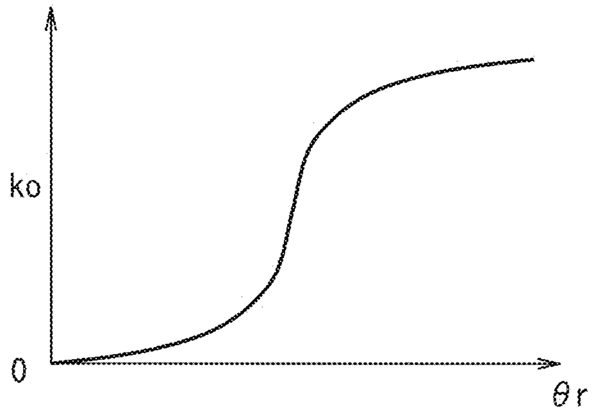
FIGS. 5A and 5B are a characteristic diagram illustrative of a characteristic example of a spring constant table and a characteristic diagram illustrative of a characteristic example of a viscosity constant table, respectively.

The spring constant table 60 is a data table calculating a spring constant k0 of a steering system. The spring constant k0 has a characteristic of comparatively steeply increasing (nonlinearly increasing) at a middle portion of a change region as the control rotational displacement θr increases, as illustrated in FIG. 5A. Note that a characteristic in the case where the control rotational displacement θr is a negative value is a characteristic that is line symmetric to the characteristic in FIG. 5A with the spring-constant-k0 axis (ordinate axis) as the symmetry axis.

Figure 5B:
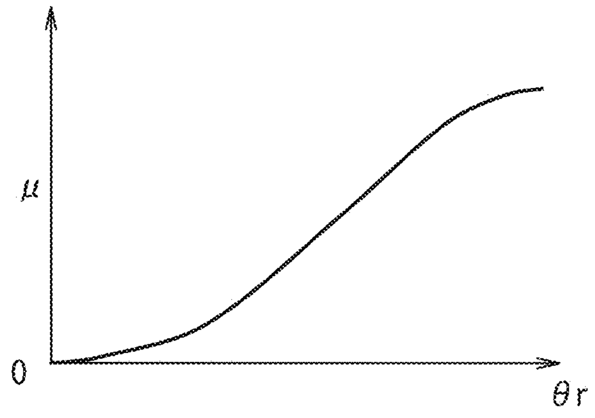

The viscosity constant table 62 is a data table calculating a viscosity constant μ of the steering system. The viscosity constant μ has a characteristic of comparatively gently and gradually increasing (nonlinearly increasing) over the entire range as the control rotational displacement θr increases, as illustrated in FIG. 5B. Note that a characteristic in the case where the control rotational displacement θr is a negative value is a characteristic that is line symmetric to the characteristic in FIG. 5B with the viscosity-constant-μ axis (ordinate axis) as the symmetry axis.

The spring constant k0 from the spring constant table 60 is multiplied by the control rotational displacement θr by the multiplier 61, and a multiplication result k0×θr is input to the adder 64. In addition, the viscosity constant μ from the viscosity constant table 62 is multiplied by the steering angular velocity ω by the multiplier 63, and a multiplication result μ×ω is input to the adder 64. An addition result (=k0×θr+μ×ω) by the adder 64 is input to the inverter 65 and the limiter 66, and the impact mitigation control output Iref2 the sign of which is inverted and the maximum value of which is limited is set.

Note that the configuration of the impact mitigation control unit 49 in FIG. 4 is only an exemplification and the present invention is not limited to the above-described configuration. The impact mitigation control unit 49 is only required to have a configuration capable of outputting the impact mitigation control output Iref2 that suppresses increase in the steering angle θh when the corrected steering angle θh1 comes close to a rack end position.

Next, details of the terminal position learning unit 46 will be described. The terminal position learning unit 46 calculates, within a range of angle that the steering angle θh detected by the steering angle sensor 14 when rotational force applied to the turning mechanism is less than or equal to a first predetermined value can take, a steering angle that is positioned farthest from the steering angle neutral position (in the case of the positive steering angle θh, the maximum steering angle, and in the case of the negative steering angle θh, the minimum steering angle) as a first candidate θm1 of the virtual rack end.

For example, the terminal position learning unit 46 may calculate a first candidate θm1 of the virtual rack end when column output shaft torque Tc applied to the column output shaft 2*o* is less than or equal to a predetermined value T1.

The terminal position learning unit 46 may calculate, within a range of angle that the steering angle θh detected by the steering angle sensor 14 when the rotational force applied to the turning mechanism is less than or equal to the first predetermined value and operational force acting on a steering operation unit is less than or equal to a third predetermined value can take, a steering angle that is positioned farthest from the steering angle neutral position as the first candidate θm1 of the virtual rack end.

For example, the terminal position learning unit 46 may calculate the first candidate θm1 when the column output shaft torque Tc is less than or equal to the predetermined value T1 and the steering torque Th is less than or equal to a predetermined value T2.

In addition, the terminal position learning unit 46 calculates, within a range of an angle obtained by shifting the steering angle θh detected by the steering angle sensor 14 in a direction toward the steering angle neutral position by a second predetermined value, a steering angle that is positioned farthest from the steering angle neutral position (that is, in the case of the positive steering angle θh, an angle obtained by subtracting the second predetermined value from the maximum steering angle, and in the case of the negative steering angle θh, an angle obtained by adding the second predetermined value to the minimum steering angle) as a second candidate θm2 of the virtual rack end. As the second predetermined value, for example, a maximum value that can be taken as error may be set.

The terminal position learning unit 46 selects a steering angle that is positioned farthest from the steering angle neutral position among the first candidate θm1 and the second candidate θm2 as the virtual rack end positions θevr and θevl.

This configuration can reduce influence of torsion or the like occurring due to torque and reduce error between the virtual rack end positions θevr and θevl and actual rack end positions.

Figure 6:
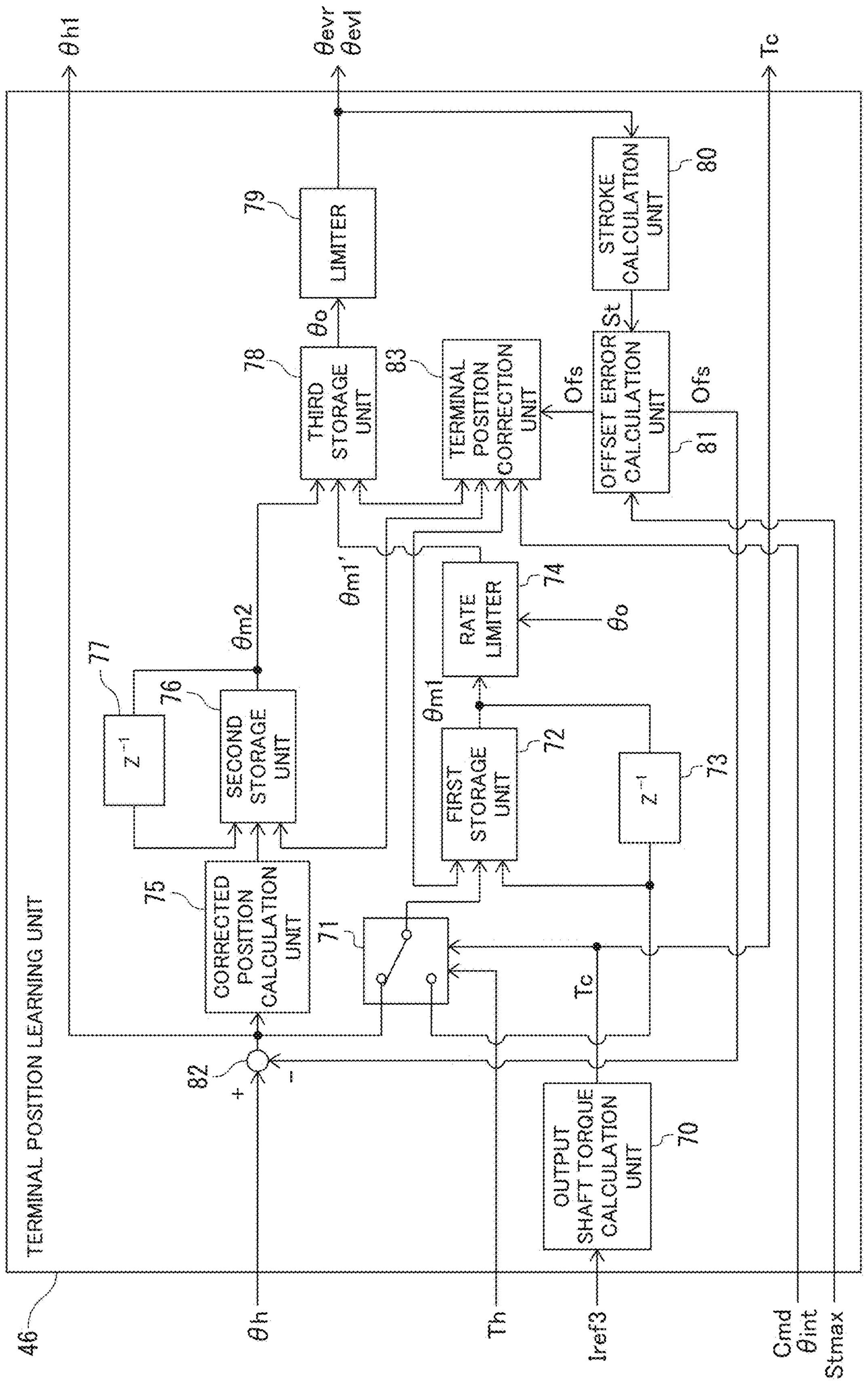
FIG. 6 is a block diagram illustrative of an example of a functional configuration of a terminal position learning unit.

FIG. 6 is a block diagram illustrative of an example of a functional configuration of the terminal position learning unit 46. The terminal position learning unit 46 includes an output shaft torque calculation unit 70, a selection unit 71, a first storage unit 72, delay units 73 and 77, a rate limiter 74, a corrected position calculation unit 75, a second storage unit 76, a third storage unit 78, a limiter 79, a stroke calculation unit 80, an offset error calculation unit 81, a subtracter 82, and a terminal position correction unit 83.

The output shaft torque calculation unit 70 calculates the column output shaft torque Tc applied to the column output shaft 20.

For example, the output shaft torque calculation unit 70 may calculate, as the column output shaft torque Tc, motor torque estimated by multiplying the current command value Iref3 for the motor 20 or the motor current value Im detected by the current detector 50 by a motor torque constant and a reduction ratio of the reduction gear 3.

For example, the output shaft torque calculation unit 70 may calculate, as the column output shaft torque Tc, a sum of motor torque estimated by multiplying the current command value Iref3 for the motor 20 by the motor torque constant and the reduction ratio of the reduction gear 3 and the steering torque Th detected by the torque sensor 10.

In addition, for example, the output shaft torque calculation unit 70 may also calculate, as the column output shaft torque Tc, a sum of motor torque estimated by multiplying the motor current value Im detected by the current detector 50 by the motor torque constant and the reduction ratio of the reduction gear 3 and the steering torque Th detected by the torque sensor 10.

In addition, the output shaft torque calculation unit 70 may calculate motor angular acceleration by second-order differentiating a detected value of the angle sensor of the motor 20, estimate inertia torque by multiplying the motor angular acceleration by an inertia moment, and add the inertia torque to the column output shaft torque Tc calculated as described above.

The column output shaft torque Tc is an example of the "rotational force applied to the turning mechanism". The steering torque Th is an example of the "operational force acting on a steering operation unit of the vehicle".

The subtracter 82 calculates the corrected steering angle θh1 by subtracting the offset error Ofs calculated by the offset error calculation unit 81 from the steering angle θh detected by the steering angle sensor 14. The calculation of the offset error Ofs by the offset error calculation unit 81 will be described later.

The selection unit 71 selects one of the corrected steering angle θh1 and output from the delay unit 73 depending on values of the column output shaft torque Tc and the steering torque Th and outputs the selected one to the first storage unit 72. The delay unit 73 delays the first candidate θm1 of the virtual rack end that is stored in and output from the first storage unit 72 and outputs the delayed first candidate θm1.

For example, the selection unit 71 may, when the column output shaft torque Tc is less than or equal to the predetermined value T1 and the steering torque Th is less than or equal to the predetermined value T2, select the corrected steering angle θh1 calculated from the detected steering angle θh and output the corrected steering angle θh1 to the first storage unit 72 and, otherwise, output the output from the delay unit 73 to the first storage unit 72.

The first storage unit 72 stores the position farther from the steering angle neutral position than the other among the output from the delay unit 73 and the corrected steering angle θh1 as the first candidate θm1 of the virtual rack end.

Because of this configuration, when the corrected steering angle θh1 that is calculated when the column output shaft torque Tc is less than or equal to the predetermined value T1 and the steering torque Th is less than or equal to the predetermined value T2 is positioned farther from the steering angle neutral position than the first candidate θm1 having been stored in the first storage unit 72 up to that time, the first candidate θm1 stored in the first storage unit 72 is updated by the corrected steering angle θ*h*1.

Note that the selection unit 71 may, when the column output shaft torque Tc is less than or equal to the predetermined value T1, select the corrected steering angle θ*h*1 and output the corrected steering angle θ*h*1 to the first storage unit 72 and, otherwise, output the output from the delay unit 73 to the first storage unit 72.

The rate limiter 74 accepts as input the first candidate θm1 output from the first storage unit 72 and a steering angle do output from the third storage unit. The rate limiter 74 limits a change rate of the first candidate θm1 with respect to the steering angle θo delayed by a delay unit (not illustrated) and outputs a first candidate θm1' generated by limiting the change rate of the first candidate θm1 to the third storage unit 78.

The corrected position calculation unit 75 calculates an angle obtained by shifting the corrected steering angle θh1 in the direction toward the steering angle neutral position by the second predetermined value. That is, when the corrected steering angle θ*h*1 is positive, the corrected position calculation unit 75 outputs an angle obtained by subtracting the second predetermined value from the corrected steering angle θh1. When the corrected steering angle θh1 is negative, the corrected position calculation unit 75 outputs an angle obtained by adding the second predetermined value to the corrected steering angle θ*h*1.

The second storage unit 76 stores the position farther from the steering angle neutral position than the other among the output from the corrected position calculation unit 75 and output from the delay unit 77 as the second candidate θm2 of the virtual rack end. The delay unit 77 delays the second candidate θm2 of the virtual rack end that is stored in and output from the second storage unit 76 and outputs the delayed second candidate θm2.

Because of this configuration, when the output from the corrected position calculation unit 75 (that is, an angle obtained by shifting the corrected steering angle θh1 in the direction toward the steering angle neutral position by the second predetermined value) is positioned farther from the steering angle neutral position than the second candidate θm2 having been stored in the second storage unit 76 up to that time, the second candidate θm2 stored in the second storage unit 76 is updated by the output from the corrected position calculation unit 75. The third storage unit 78 stores the position farther from the steering angle neutral position than the other among the first candidate θm1' the change rate of which is limited by the rate limiter 74 and the second candidate θm2 as the steering angle do and outputs the steering angle θ0.

The limiter 79 limits the magnitude of the steering angle θ0, which is output from the third storage unit 78, and outputs the limited steering angle do as the virtual rack end positions θevr and θevl.

Figure 7A:
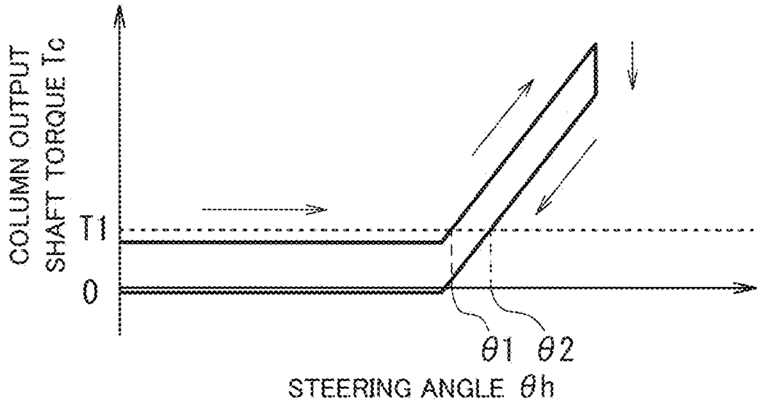
FIGS. 7A and 7B are an explanatory diagram of an example of change in column output shaft torque associated with change in a steering angle and an explanatory diagram of an example of a learned value of a terminal position when the column output shaft torque in FIG. 7A is generated, respectively.
Figure 7B:
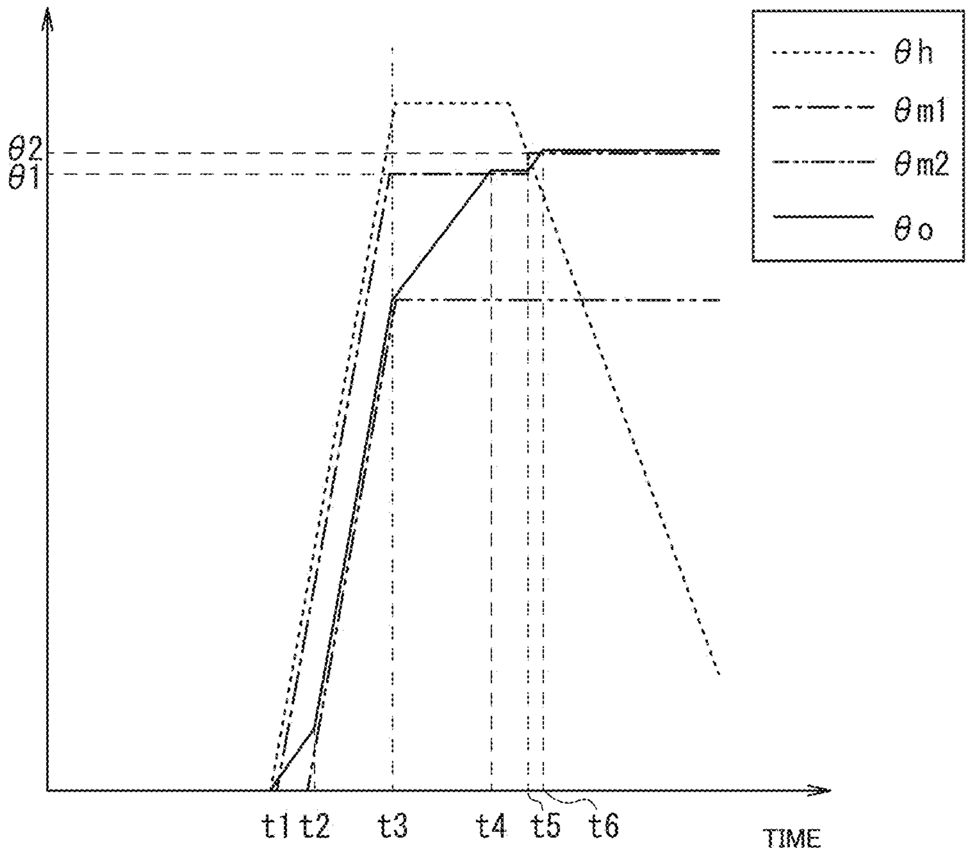

With reference to FIGS. 7A and 7B, a learning example of a virtual rack end according to the present embodiment will be described. For simplification of description, it is assumed that the offset error Ofs is 0 (that is, (steering angle θh)=(corrected steering angle θ*h*1) holds), and a case is described where when the steering angle θh that is detected when the column output shaft torque Tc is less than or equal to the predetermined value T1 is positioned farther from the steering angle neutral position than the first candidate θm1 having been stored in the first storage unit 72 up to that time, the first candidate θm1 is updated.

FIG. 7A is an explanatory diagram of an example of change in the column output shaft torque Tc associated with change in the steering angle θh. Arrows in the drawing indicate steering directions.

At the time of additional turning of the steering wheel, the column output shaft torque Tc exceeds the predetermined value T1 when the steering angle θh exceeds θ1, and at the time of subsequent reverse turning of the steering wheel, the column output shaft torque Tc becomes less than the predetermined value T1 when the steering angle θh becomes less than θ2 (θ2>θ1).

FIG. 7B is an explanatory diagram of an example of a learned value of a virtual rack end in the rightward steering when the column output shaft torque Tc in FIG. 7A is generated. The dashed line, the dashed-dotted line, the dashed-two-dotted line, and the solid line indicate the steering angle θh, the first candidate θm1, the second candidate θm2, and the output do from the third storage unit 78 (the virtual rack end positions θevr and θevl before being limited by the limiter 79), respectively. Note that the dashed-dotted line and the dashed-two-dotted line are illustrated at slightly shifted positions lest the dashed-dotted line and the dashed-two-dotted line overlap other lines.

When, at time t1, the steering angle θh increases and the additional turning of the steering wheel is started, while the column output shaft torque Tc is less than or equal to the predetermined value T1 (that is, while the steering angle θh is less than or equal to θ1), the steering angle θh (dashed line) is learned as the first candidate θm1 (dashed-dotted line). During the additional turning of the steering wheel, the first candidate θm1 (dashed-dotted line) increases to θ1.

In addition, an angle obtained by subtracting the second predetermined value from the steering angle θh is learned as the second candidate θm2 (dashed-two-dotted line).

Thus, while the first candidate θm1' the change rate of which is limited by the rate limiter 74 is greater than the second candidate θm2 (dashed-two-dotted line) (from time t1 to time t2), the first candidate θm1' is selected as the output θo (solid line) from the third storage unit 78, and when, at time t2, the second candidate θm2 exceeds the first candidate θm1', the second candidate θm2 is selected as the output to (solid line).

Subsequently, when, at time t3, the steering angle θh ceases to increase and stays at a constant value, the second candidate θm2 (dashed-two-dotted line) also ceases to increase. Thus, thereafter, the first candidate θm1' the change rate of which is limited by the rate limiter 74 is selected as the output θo (solid line) from the third storage unit 78.

Since, as described above, the first candidate θm1 (dashed-dotted line) increases to θ1, the output θo (solid line) from the third storage unit 78 also increases to θ1 behind the first candidate θm1. When, at time t4, the output θo (solid line) reaches θ1, the output θo ceases to increase.

When, subsequently, the steering angle θh starts to decrease and the reverse turning of the steering wheel is started, the steering angle θh decreases to θ2 at time t5. Then, the column output shaft torque Tc becomes less than or equal to the predetermined value T1. Thus, the angle θ2 is learned as the first candidate θm1 (dashed-dotted line).

Thus, the first candidate θm1' the change rate of which is limited by the rate limiter 74 starts to increase and is selected as the output θo (solid line) from the third storage unit 78. The output θo (solid line) increases until reaching θ2 at time t6 and subsequently becomes constant.

When comparing the output θo (solid line) from the third storage unit 78 that is learned as described above, that is, the virtual rack end positions θevr and θevl before being limited by the limiter 79, with a case where an angle obtained by simply subtracting the second predetermined value (for example, a maximum error estimation value) from the steering angle θh is learned (dashed-two-dotted line), the output θo from the third storage unit 78 can be learned as a steering angle positioned farther from a steering angle neutral point than the other. Thus, a steering angle positioned closer to an actual rack end position can be learned as the virtual rack end positions θevr and θevl.

Next, the learning state determination unit 51 will be described. FIG. 2 is now referred to. The learning state determination unit 51 determines, based on the virtual rack end positions θevr and θevl output from the terminal position learning unit 46, a state of learning of a virtual rack end position by the terminal position learning unit 46.

The learning state determination unit 51 outputs, depending on a determination result on the state of learning of a virtual rack end position, one of 0 and positive limiting values Limit1 and Limit2 to the impact mitigation control output limiting unit 52 as a limiting value to limit the upper limit of the impact mitigation control output Iref2 at the time of leftward steering.

The limiting value Limit2 is a larger value than the limiting value Limit1, and may, for example, be set to a sufficiently large value to effectively prevent impact and hit sound (abnormal noise) due to end-abutting. On the other hand, the limiting value Limit1 may be set to a value that, although allowing a certain level of impact and hit sound (abnormal noise), can prevent damage to the steering mechanism due to end-abutting.

The learning state determination unit 51 also outputs, depending on a determination result on the state of learning of a virtual rack end position, one of 0 and negative limiting values −Limit1 and −Limit2 to the impact mitigation control output limiting unit 52 as a limiting value to limit the lower limit of the impact mitigation control output Iref2 at the time of rightward steering.

Specifically, as initial values before start of learning of the virtual rack end positions θevr and θevl, a positive initial value θint and a negative initial value −θint are stored, respectively, in the first storage unit 72, the second storage unit 76, and the third storage unit 78.

The initial values θint and −θint may be appropriately set in such a way that there is no possibility that the initial values θint and −θint are positioned on the outer side of actual rack end positions (that is, in such a way that there is no possibility that the initial values θint and −θint are positioned farther from the steering angle neutral point than the actual rack end positions). For example, the initial values θint and −θint may be set in such a manner that θint=(rack stroke minimum value Stmin)−(rack end maximum value fevmax) holds.

In the setting, the rack stroke minimum value Stmin may be set to a minimum value of variation in values that can be calculated as a rack stroke between the virtual rack end positions θevr and θevl (for example, a lower limit of manufacturing tolerance).

In addition, the "rack end maximum value θevmax" is a maximum value of absolute values of values that can be learned as the virtual rack end positions θevr and θevl and may be set in such a manner that the rack end maximum value θevmax=(rack stroke maximum value Stmax)/2+(estimated value of offset error between rack neutral position and steering angle neutral position) holds.

In addition, the rack stroke maximum value Stmax is a maximum value of variation in values that can be calculated as the rack stroke between the virtual rack end positions θevr and θevl and may, for example, be set to a value obtained by adding learning error of the virtual rack end positions θevr and θevl to an upper limit of manufacturing tolerance.

When the right virtual rack end position θevr output from the terminal position learning unit 46 is less than a predetermined learning threshold value θlth, the learning state determination unit 51 determines that learning of the right virtual rack end position θevr has not been performed and outputs "0" as a limiting value to limit the lower limit of the impact mitigation control output Iref2.

As the "learning threshold value θlth", a minimum value of the absolute values of values that can be learned as the virtual rack end positions θevr and θevl may be set, and the "learning threshold value θlth" may, for example, be set in such a manner that the learning threshold value θlth=(rack stroke minimum value Stmin)/2−(estimated value of offset error between rack neutral position and steering angle neutral position) holds.

Likewise, when the left virtual rack end position θevl is greater than a negative learning threshold value −θlth (that is, the absolute value |θevl| is less than the absolute value |θlth|), the learning state determination unit 51 determines that learning of the left virtual rack end position θevl has not been performed and outputs "0" as a limiting value to limit the upper limit of the impact mitigation control output Iref2.

When the right virtual rack end position θevr is greater than or equal to the predetermined learning threshold value θlth, the learning state determination unit 51 determines that the learning of the right virtual rack end position θevr has been performed and outputs "−Limit1" as a limiting value to limit the lower limit of the impact mitigation control output Iref2.

Likewise, when the left virtual rack end position θevl is less than or equal to the negative learning threshold value −θlth (that is, the absolute value |θevl| is greater than or equal to the absolute value |θlth|), the learning state determination unit 51 determines that the learning of the left virtual rack end position θevl has been performed and outputs "Limit1" as a limiting value to limit the upper limit of the impact mitigation control output Iref2.

Further, the learning state determination unit 51 calculates distance between the right virtual rack end position θevr and the left virtual rack end position θevl as rack stroke St.

When the absolute values of learned values of the virtual rack end positions θevr and θevl become large and the rack stroke St becomes longer than the rack stroke minimum value Stmin, the learning state determination unit 51 determines that the learning of the virtual rack end positions θevr and θevl has been completed and outputs "−Limit2" and "Limit2" as a limiting value to limit the lower limit of the impact mitigation control output Iref2 and a limiting value to limit the upper limit of the impact mitigation control output Iref2, respectively.

Next, an example of a manner in which, depending on a change in the state of learning of the virtual rack end positions, the limiting value that the learning state determination unit 51 outputs changes will be described.

FIGS. 8A, 8B, 8C, 8D, 8E, and 8F are a conceptual diagram of actual rack end positions, a conceptual diagram of a state before start of learning of virtual rack end positions, a conceptual diagram of a state in which the right virtual rack end position θevr has been learned, a conceptual diagram of a state in which the left virtual rack end position θevl has been learned, a conceptual diagram of a state in which the learning of the virtual rack ends θevr and θevl is considered to have been completed, and a conceptual diagram of a state in which the learning of the virtual rack ends has been continued to the vicinities of the actual rack ends, respectively.

In addition, limiting values in a table in FIG. 10 indicate limiting values that the learning state determination unit 51 outputs in the states illustrated in FIGS. 8B to 8F.

In FIGS. 8B to 8F, "0 [deg]" indicates the steering angle neutral position. The same applies to FIGS. 9B to 9H, which are described later.

In FIGS. 8B to 8F, the steering angle neutral position substantially coincides with the rack neutral position (the center position between the actual rack end positions).

In the state before start of learning of the virtual rack end positions (FIG. 8B), the right virtual rack end position θevr, which is output from the terminal position learning unit 46, is θint with reference to the steering angle neutral position and less than the learning threshold value θlth.

Therefore, the learning state determination unit 51 determines that the learning of the right virtual rack end position θevr has not been performed and outputs "0" as a limiting value to limit the lower limit of the impact mitigation control output Iref2 (see FIG. 10).

In addition, the left virtual rack end position θevl, which is output from the terminal position learning unit 46, is −θint with reference to the steering angle neutral position and greater than the learning threshold value −θlth. Therefore, the learning state determination unit 51 determines that the learning of the left virtual rack end position θevl has not been performed and outputs "0" as a limiting value to limit the upper limit of the impact mitigation control output Iref2 (see FIG. 10).

Figures 8A, 8B, 8C, 8D, 8E, 8F:
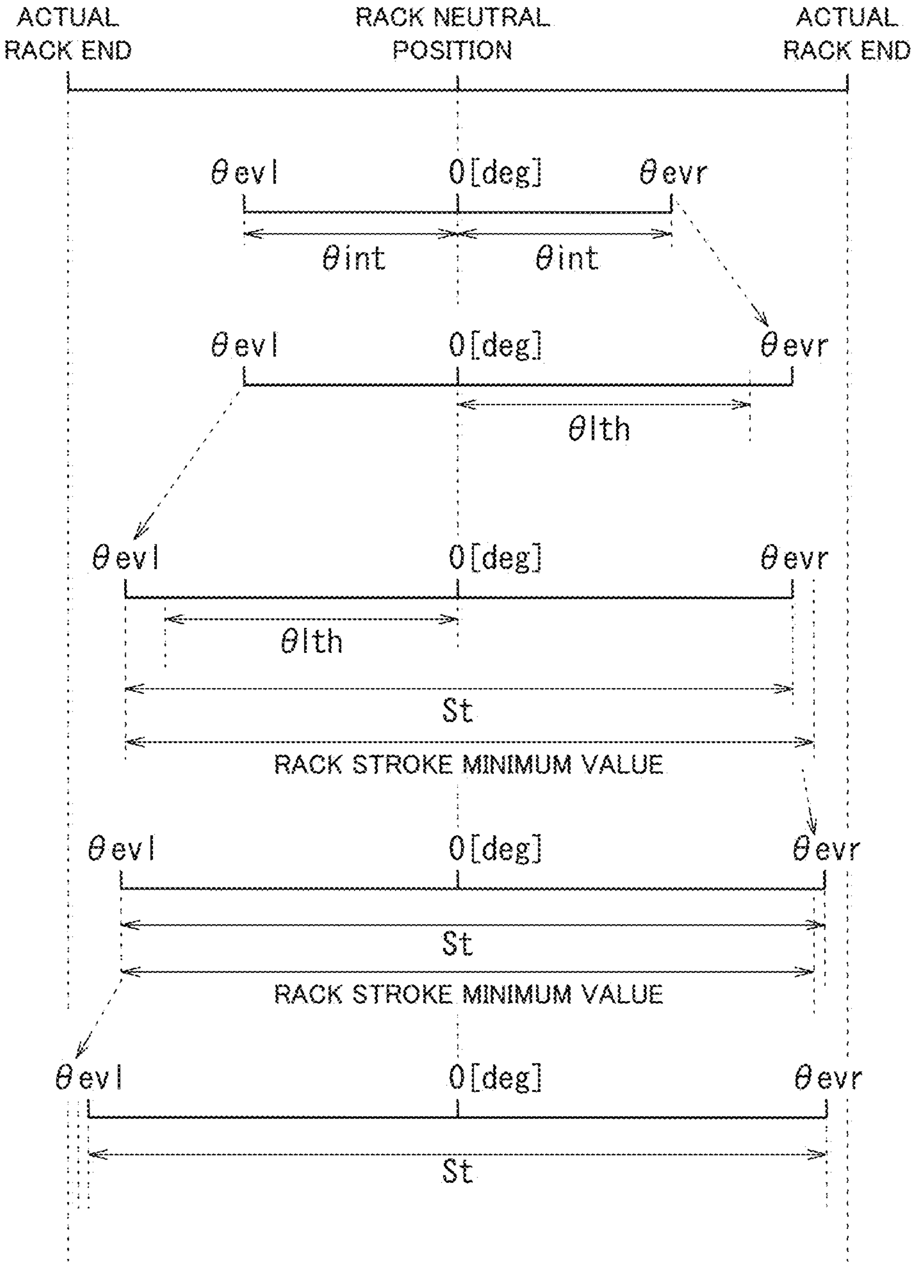
FIGS. 8A, 8B, 8C, 8D, 8E, and 8F are a conceptual diagram of actual rack end positions, a conceptual diagram of a state before start of learning of virtual rack end positions, a conceptual diagram of a state in which a right virtual rack end position has been learned, a conceptual diagram of a state in which a left virtual rack end position has been learned, a conceptual diagram of a state in which learning of the virtual rack ends is considered to have been completed, and a conceptual diagram of a state in which the learning of the virtual rack ends has been continued to the vicinities of the actual rack ends, respectively.

Subsequently, as illustrated in FIG. 8C, the right virtual rack end position θevr is learned. Since the right virtual rack end position θevr is greater than or equal to the learning threshold value θlth, the learning state determination unit 51 determines that the learning of the right virtual rack end position θevr has been performed and outputs "−Limit1" as a limiting value to limit the lower limit of the impact mitigation control output Iref2. On the other hand, since the left virtual rack end position θevl has not changed, the learning state determination unit 51 outputs "0" as a limiting value to limit the upper limit of the impact mitigation control output Iref2 (see FIG. 10).

Subsequently, as illustrated in FIG. 8D, the left virtual rack end position θevl is learned. Since the left virtual rack end position θevl becomes less than or equal to the negative learning threshold value −θlth, the learning state determination unit 51 determines that the learning of the left virtual rack end position θevl has been performed. However, since the rack stroke St is less than or equal to the rack stroke minimum value Stmin, the learning state determination unit 51 does not determine that the learning of the virtual rack end positions θevr and θevl has been completed.

Therefore, the learning state determination unit 51 outputs "Limit1" as a limiting value to limit the upper limit of the impact mitigation control output Iref2. The learning state determination unit 51 also outputs "−Limit1" as a limiting value to limit the lower limit of the impact mitigation control output Iref2.

Subsequently, as illustrated in FIG. 8E, further learning of the right virtual rack end position θevr causes the rack stroke St to become longer than the rack stroke minimum value Stmin. Therefore, the learning state determination unit 51 determines that the learning of the virtual rack end positions θevr and θevl has been completed and outputs "Limit2" and "−Limit2" as limiting values to limit the upper limit and the lower limit of the impact mitigation control output Iref2, respectively.

Subsequently, repeating the learning of the virtual rack end positions θevr and θevl causes the virtual rack end positions θevr and θevl to come close to the actual rack end positions (see FIG. 8F).

The learning state determination unit 51 outputs "Limit2" and "−Limit2" as limiting values to limit the upper limit and the lower limit of the impact mitigation control output Iref2, respectively, until the rack stroke St exceeds the rack stroke maximum value Stmax.

Figures 9A, 9B, 9C, 9D, 9E, 9F, 9G, 9H:
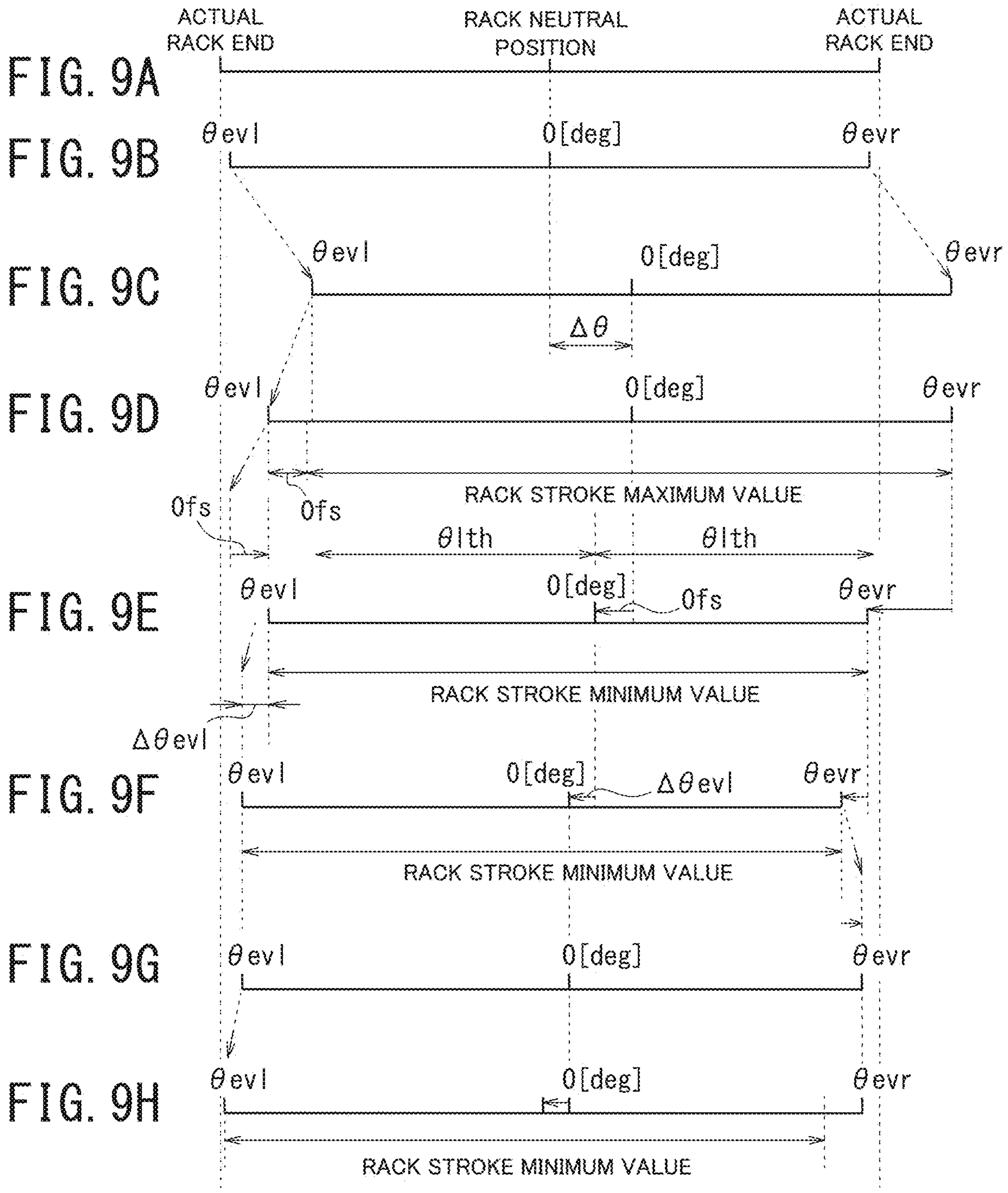
FIGS. 9A, 9B, 9C, 9D, 9E, 9F, 9G, and 9H are a conceptual diagram of the actual rack end positions, a conceptual diagram illustrative of the same state as the state in FIG. 8F, a conceptual diagram of a state immediately after offset error has occurred, a conceptual diagram of a state in which a learned position of the left virtual rack end position is updated, a conceptual diagram of correction of a steering angle detected by a steering angle sensor and resetting of a learned value of the right virtual rack end position, a conceptual diagram of a state in which a learned position of the left virtual rack end position is further updated, a conceptual diagram of a state in which learning of the virtual rack ends is considered to have been completed, and a conceptual diagram of a state in which a learned position of the left virtual rack end position is further updated, respectively.

Next, operation in the case where offset error occurs between the rack neutral position and the steering angle neutral position will be described. FIG. 9A is a conceptual diagram of the actual rack end positions, FIG. 9B is the same drawing as FIG. 8F and illustrates a state in which there is no offset error, and FIG. 9C is a conceptual diagram of a state immediately after offset error has occurred.

The steering angle neutral position in FIG. 9B substantially coincides with the rack neutral position (the center position between the actual rack end positions), and the steering angle neutral position in FIG. 9C is shifted to the right side from the rack neutral position by Δθ. That is, when the steering wheel is steered to the left side of the steering angle neutral position by Δθ, the rack 5*b* is positioned at the rack neutral position.

When offset error occurs, the impact mitigation control cannot be normally performed. In the example in FIG. 9C, since the right virtual rack end position θevr is positioned on the outer side of the actual rack end position, necessary reduction in impact and abnormal noise cannot be performed.

Thus, the terminal position learning unit 46, as described above, estimates an offset error Ofs between the rack neutral position and the steering angle neutral position and outputs the corrected steering angle θh1, to which the steering angle θh detected by the steering angle sensor 14 is corrected by subtracting the offset error Ofs from the steering angle θh.

FIG. 6 is now referred to. The stroke calculation unit 80 calculates the rack stroke St. The offset error calculation unit 81 compares the rack stroke St with the rack stroke maximum value Stmax.

When the rack stroke St exceeds the rack stroke maximum value Stmax, the offset error calculation unit 81 determines that offset error has occurred. The offset error calculation unit 81 calculates a difference obtained by subtracting the rack stroke maximum value Stmax from the rack stroke St as the offset error Ofs=(rack stroke St)−(rack stroke maximum value Stmax).

FIG. 9D is a conceptual diagram of a state in which, after offset error has occurred, the left virtual rack end position θevl is learned.

Since the steering angle neutral position is shifted to the right side of the rack neutral position, when the left virtual rack end position θevl is newly learned, the rack stroke St between the virtual rack end positions θevr and θevl exceeds the rack stroke maximum value Stmax. The offset error calculation unit 81 calculates a difference obtained by subtracting the rack stroke maximum value Stmax from the rack stroke St (rack stroke St-rack stroke maximum value Stmax) as the offset error Ofs.

In the following description, a virtual rack end position that is one of the right and left virtual rack end positions that is learned when a rack stroke St exceeding the rack stroke maximum value Stmax is calculated is sometimes referred to as "one virtual rack end position". In addition, a virtual rack end position that is one of the right and left virtual rack end positions that is not the one virtual rack end position is sometimes referred to as "the other virtual rack end position".

When, as in the example in FIG. 9C, the steering angle neutral position is shifted to the right side from the rack neutral position, the left virtual rack end position serves as one virtual rack end position and the right virtual rack end position serves as the other virtual rack end position. Conversely, when the steering angle neutral position is shifted to the left side from the rack neutral position, the right virtual rack end position serves as one virtual rack end position and the left virtual rack end position serves as the other virtual rack end position.

FIG. 6 is now referred to. The subtracter 82 calculates the corrected steering angle θ*h*1 by subtracting the offset error Ofs calculated by the offset error calculation unit 81 from the steering angle θh detected by the steering angle sensor 14.

The terminal position correction unit 83 corrects the first candidate θm1 that the first storage unit 72 stores, the second candidate θm2 that the second storage unit 76 stores, and the steering angle do that the third storage unit 78 stores according to the offset error Ofs. With reference to FIG. 9E, the correction processing of the candidates and the steering angle will be described.

The subtracter 82 subtracting the offset error Ofs from the steering angle θh causes the steering angle neutral position (position at "0 [deg]") to move, as illustrated in FIG. 9E.

On the other hand, since the left virtual rack end position θevl (that is, one virtual rack end position) that was learned in FIG. 9D is a learned value before the steering angle neutral position, which serves as the base point, moves, when the steering angle neutral position is moved as illustrated in FIG. 9E, it is necessary to correct the left virtual rack end position θevl in association with this movement.

The terminal position correction unit 83 corrects the first candidate θm1 of the left virtual rack end position stored in the first storage unit 72 with the offset error Ofs. Since the left virtual rack end position is a negative value, the terminal position correction unit 83 corrects the left virtual rack end position by adding the offset error Ofs. The terminal position correction unit 83 also likewise corrects the second candidate θm2 and the steering angle do that are stored in the second storage unit 76 and the third storage unit 78, respectively.

When the one virtual rack end position is the right virtual rack end position (that is, when the virtual rack end position is a positive value), the terminal position correction unit 83 corrects the right virtual rack end position by subtracting the offset error Ofs.

In addition, the terminal position correction unit 83 corrects (resets) the other virtual rack end position (in the example in FIG. 9E, the right virtual rack end position θevr) in such a way that the rack stroke St between the virtual rack end positions θevr and θevl coincides with the predetermined rack stroke minimum value Stmin. This configuration can correct the other virtual rack end position to a position on the inner side of the actual rack end position.

FIG. 9F is now referred to. When a new left virtual rack end position θevl is further learned, the offset error calculation unit 81 calculates a change amount Δθevl of the virtual rack end position θevl between before and after update.

The offset error calculation unit 81, by adding the change amount Δθevl to the offset error Ofs before the new left virtual rack end position θevl is learned, updates the offset error Ofs. This update causes the steering angle neutral position to further move by the change amount Δθevl.

The terminal position correction unit 83 corrects the first candidate θm1 of the one virtual rack end position (the left virtual rack end position) that is stored in the first storage unit 72 with the change amount Δθevl. Since the left virtual rack end position is a negative value, the terminal position correction unit 83 corrects the left virtual rack end position by adding the change amount Δθevl. The terminal position correction unit 83 also likewise corrects the second candidate θm2 and the steering angle do that are stored in the second storage unit 76 and the third storage unit 78, respectively.

When the one virtual rack end position is the right virtual rack end position (that is, the virtual rack end position is a positive value), the terminal position correction unit 83 corrects the first candidate θm1 by subtracting the change amount Δθevl.

In addition, the terminal position correction unit 83 corrects (resets) the other virtual rack end position (in the example in FIG. 9F, the right virtual rack end position θevr) in such a way that the rack stroke St between the virtual rack end positions θevr and θevl coincides with the rack stroke minimum value Stmin.

FIG. 9G is now referred to. When a new right virtual rack end position θevr (that is, the other virtual rack end position) is learned, the offset error calculation unit 81 does not update the offset error Ofs. That is, the steering angle neutral position is not moved.

In addition, the terminal position correction unit 83 also does not correct the first candidate θm1 that the first storage unit 72 stores, the second candidate θm2 that the second storage unit 76 stores, and the steering angle do that the third storage unit 78 stores. Because of this configuration, only the right virtual rack end position θevr is updated in such a manner as to move away from the steering angle neutral position.

FIG. 9H is now referred to. After a new right virtual rack end position θevr has been learned in FIG. 9G, even when a new left virtual rack end position θevl (that is, the one virtual rack end position) is further learned, the terminal position correction unit 83 does not correct (reset) the right virtual rack end position θevr in such a way that the rack stroke St coincides with the predetermined rack stroke minimum value Stmin.

As with FIG. 9F, the offset error calculation unit 81 updates the offset error Ofs (that is, the steering angle neutral position is modified), which causes the steering angle neutral position to move, and the terminal position correction unit 83 corrects the left virtual rack end position θevl. On this occasion, the right virtual rack end position θevr is corrected by adding the offset error Ofs to the virtual rack end position θevr.

In addition, when a new right virtual rack end position θevr (that is, the other virtual rack end position) is further learned, the steering angle neutral position and the left virtual rack end position θevl (that is, the one virtual rack end position) are not changed and only the right virtual rack end position θevr changes.

Next, operation of the learning state determination unit 51 in the case where offset error occurs will be described. The learning state determination unit 51 determines that offset error has occurred when the rack stroke St, which is calculated from the right virtual rack end position θevr and the left virtual rack end position θevl, is longer than the rack stroke maximum value Stmax.

When determining that offset error has occurred, the learning state determination unit 51 resets each of the limiting values to limit the upper limit and the lower limit of the impact mitigation control output Iref2 to "0"

Subsequently, when the right virtual rack end position θevr is, as with the above description, greater than or equal to the predetermined learning threshold value θlth, the learning state determination unit 51 outputs "−Limit1" as a limiting value to limit the lower limit of the impact mitigation control output Iref2. When the left virtual rack end position θevl is less than or equal to the negative learning threshold value −θlth, the learning state determination unit 51 outputs "Limit1" as a limiting value to limit the upper limit of the impact mitigation control output Iref2. When the rack stroke St becomes longer than the rack stroke minimum value Stmin, the learning state determination unit 51 outputs "Limit2" and "−Limit2" as limiting values to limit the upper limit and the lower limit of the impact mitigation control output Iref2, respectively.

With reference to FIGS. 9A to 9F and 10, an example of limiting values that the learning state determination unit 51 outputs when offset error has occurred will be described. Limiting values in the table in FIG. 10 indicate limiting values that the learning state determination unit 51 outputs in the states illustrated in FIGS. 9B to 9H.

FIG. 9B is the same as FIG. 8F and illustrates a state before offset error occurs. The learning state determination unit 51 outputs "Limit2" and "−Limit2" as limiting values to limit the upper limit and the lower limit of the impact mitigation control output Iref2, respectively.

Subsequently, when offset error occurs due to a reason such as incorrect assembly of the intermediate shaft 4, the state in FIG. 9B transitions to the state illustrated in FIG. 9C. Since, in this stage, learning of new virtual rack ends θevr and θevl has not been performed, the value of the rack stroke St that the learning state determination unit 51 calculates stays at the same value as that in the state in FIG. 9B. Therefore, the learning state determination unit 51 has not determined that offset error occurred and has not reset the limiting values to "0". Thus, the learning state determination unit 51 outputs "Limit2" and "−Limit2".

When, in FIG. 9D, a new left virtual rack end position θevl is learned, the rack stroke St becomes longer than the rack stroke maximum value Stmax. Thus, the learning state determination unit 51 resets the limiting values to limit the upper limit and the lower limit of the impact mitigation control output Iref2 to "0"

In addition, since the left virtual rack end position θevl is less than or equal to the negative learning threshold value −θlth as in FIG. 9E, the learning state determination unit 51 determines that the learning of the left virtual rack end position θevl has been performed and outputs "Limit1" as a limiting value to limit the upper limit of the impact mitigation control output Iref2.

On the other hand, since the right virtual rack end position θevr is corrected (reset) in such a way that the rack stroke St between the virtual rack end positions θevr and θevl coincides with the rack stroke minimum value Stmin, the rack stroke St does not become longer than the rack stroke minimum value Stmin. Therefore, it is not determined that the learning of the virtual rack end positions θevr and θevl has been completed, and since the right virtual rack end position θevr is less than the learning threshold value θlth, output of "0" as a limiting value to limit the lower limit of the impact mitigation control output Iref2 is maintained. The same applies to the state in FIG. 9F.

FIG. 9G is now referred to. When a new right virtual rack end position θevr (that is, the other virtual rack end position) is learned and the rack stroke St becomes longer than the rack stroke minimum value Stmin, the learning state determination unit 51 determines that the learning of the virtual rack end positions θevr and θevl has been completed and outputs "Limit2" and "−Limit2" as limiting values to limit the upper limit and the lower limit of the impact mitigation control output Iref2, respectively.

In FIG. 9H, the learning state determination unit 51 likewise outputs "Limit2" and "−Limit2" as limiting values to limit the upper limit and the lower limit of the impact mitigation control output Iref2, respectively.

As described above, the turning control device of the present embodiment is capable of limiting the impact mitigation control output Iref2 in a stepwise manner depending on a degree of learning of the virtual rack end positions, based on a comparison result between a learned virtual rack end position and the learning threshold value θlth and a comparison result between the rack stroke St calculated from the learned virtual rack end position and the rack stroke minimum value Stmin. Because of this configuration, it is possible to learn virtual rack end positions while preventing damage to the steering mechanism due to end-abutting.

Next, the relearning determination unit 53 will be described. FIG. 2 is now referred to. The relearning determination unit 53 determines necessity of relearning of the virtual rack end position θevr or θevl depending on whether or not occurrence of end-abutting is detected. In the following description, the virtual rack end positions θevr and θevl are sometimes collectively referred to as "virtual rack end positions θev".

When the relearning of the virtual rack end positions θev is to be performed, the relearning determination unit 53 outputs a relearning command signal Cmd commanding the terminal position learning unit 46 to perform relearning. Because of this configuration, the virtual rack end positions θev can be relearned when, for example, in association with a rack shaft being replaced after the virtual rack end positions θev are learned, end-abutting occurs due to a reason, such as a rack shaft that has a length different from length of a rack shaft that should be originally mounted being mistakenly mounted or a mounting position of a rack shaft having changed between before and after replacement of the rack shaft.

FIG. 11 is a block diagram illustrative of an example of a functional configuration of the relearning determination unit 53. The relearning determination unit 53 includes an end-abutting detection unit 90, an end-abutting steering angle range determination unit 91, a counting unit 92, and a relearning unit 93.

The end-abutting detection unit 90 detects occurrence of end-abutting, based on the column output shaft torque Tc and the steering torque Th and retains an end-abutting steering angle θabt that is a steering angle when occurrence of end-abutting is detected.

For example, the end-abutting detection unit 90 retains a steering angle θdt when the steering torque Th is greater than or equal to a predetermined threshold value Tth1 (for example, 8 Nm) and, based on the retained steering angle θdt, determines necessity of detecting the end-abutting steering angle θabt. For example, the end-abutting detection unit 90 may determine that detection of the end-abutting steering angle θabt is necessary when an absolute value |θev−θdt| of a difference between the steering angle θdt and one of the virtual rack end positions θev is greater than a steering angle threshold value θtha1 and determine that the detection of the end-abutting steering angle θabt is not necessary when the absolute value |θev−θdt| of the difference between the steering angle θdt and the virtual rack end position θev is less than or equal to the steering angle threshold value θtha1.

FIG. 12A is now referred to. FIG. 12A illustrates as an example a case where the steering wheel 1 is steered to the right. In processing when the steering wheel 1 is steered to the left, the right virtual rack end position θevr in the following description is replaced by the left virtual rack end position θevl.

When the steering angle when the steering torque Th is greater than or equal to the predetermined threshold value Tth1 is a steering angle θdt1 illustrated in the drawing, the end-abutting detection unit 90 determines that the detection of the end-abutting steering angle θabt is not necessary since the absolute value |θevr−θdt1| of the difference between the virtual rack end position θevr and the steering angle θdt1 is less than or equal to the steering angle threshold value etha1. On the other hand, when the steering angle when the steering torque Th is greater than or equal to the predetermined threshold value Tth1 is a steering angle θdt2 illustrated in the drawing, the end-abutting detection unit 90 determines that the detection of the end-abutting steering angle θabt is necessary since the absolute value |θevr−θdt2| of the difference between the virtual rack end position θevr and the steering angle θdt2 is greater than the steering angle threshold value θtha1.

When determining that the detection of the end-abutting steering angle θabt is necessary, the end-abutting detection unit 90 retains a steering angle θ*cd* when, after the steering torque Th has become greater than or equal to the predetermined threshold value Tth1, the column output shaft torque Tc becomes less than a predetermined threshold value Tth2 (for example, 35 Nm) and the steering torque Th becomes less than the predetermined threshold value Tth1, as a candidate of the end-abutting steering angle θabt (hereinafter, sometimes referred to as "end-abutting steering angle candidate").

The end-abutting detection unit 90 acquires an end-abutting steering angle candidate θcd as the end-abutting steering angle θabt when an absolute value |θ*ev*−θ*cd*| of a difference between the end-abutting steering angle candidate θcd and one of the virtual rack end positions θev is greater than a steering angle threshold value θtha2. When the absolute value |θ*ev*−θcd| is less than or equal to the steering angle threshold value θtha2, the end-abutting detection unit 90 discards the end-abutting steering angle candidate θcd without acquiring the end-abutting steering angle candidate θcd as the end-abutting steering angle θabt. For example, the steering angle threshold value θtha2 may be set to a value a predetermined margin Δ smaller than the steering angle threshold value θtha1. For example, the predetermined margin Δ may be set according to detection error of the steering angle θh.

FIG. 12B is now referred to. FIG. 12B illustrates as an example the case where the steering wheel 1 is steered to the right. In the processing when the steering wheel 1 is steered to the left, the right virtual rack end position θevr in the following description is replaced by the left virtual rack end position θevl.

In a case of an end-abutting steering angle candidate θ*cd*1, the end-abutting detection unit 90 discards the end-abutting steering angle candidate θ*cd*1 without acquiring the end-abutting steering angle candidate θcd1 as the end-abutting steering angle θabt since an absolute value |θevr-θ*cd*1| of a difference between the virtual rack end position θevr and the end-abutting steering angle candidate θcd1 is less than or equal to the steering angle threshold value θtha2. On the other hand, in a case of an end-abutting steering angle candidate θ*cd*2, the end-abutting detection unit 90 acquires the end-abutting steering angle candidate θ*cd*2 as the end-abutting steering angle θabt since an absolute value |θevr−θcd2| of a difference between the virtual rack end position θevr and the end-abutting steering angle candidate θcd2 is greater than the steering angle threshold value θtha2.

Next, the end-abutting detection unit 90 calculates a rack stroke approximate value Sta, based on the acquired end-abutting steering angle θabt. When the rack stroke approximate value Sta is not a value within an allowable range, the end-abutting detection unit 90 may exclude the acquired end-abutting steering angle θabt from targets of determination processing of variation in end-abutting steering angles θabt performed by the end-abutting steering angle range determination unit 91, which will be described later, and discard the acquired end-abutting steering angle θabt.

Figure 13A:
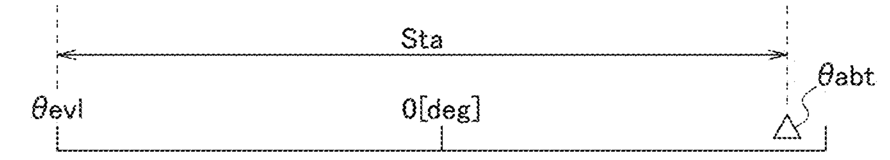
FIGS. 13A and 13B are explanatory diagrams of examples of rack stroke determination.
Figure 13B:
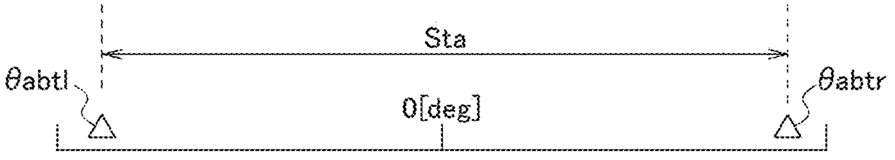

FIG. 13A illustrates a calculation example of the rack stroke approximate value Sta when in a case where the steering wheel 1 is steered to one of the left side and the right side, end-abutting does not occur and in a case where the steering wheel 1 is steered to the other of the left side and the right side, end-abutting occurs and the end-abutting steering angle θabt is acquired. FIG. 13B illustrates a calculation example of the rack stroke approximate value Sta when both in the case where the steering wheel 1 is steered to the left side and in the case where the steering wheel 1 is steered to the right side, end-abutting occurs and an end-abutting steering angle θabtl and an end-abutting steering angle θabtr are acquired both on the left side and on the right side, respectively.

When, as illustrated in FIG. 13A, the end-abutting steering angle θabt is acquired when the steering wheel 1 is steered to the right side, the end-abutting detection unit 90 calculates an absolute value of a difference between the left virtual rack end position θevl and the end-abutting steering angle θabt on the right side as the rack stroke approximate value Sta.

When error between the rack stroke approximate value Sta and a predetermined value does not fall within a threshold value, it is considered that the vehicle is in a state in which one of the steered wheels 8L and 8R collides with a curb or the like when the steering wheel 1 is steered and the steering wheel 1 cannot be steered to a rack end. Thus, when error between the rack stroke approximate value Sta and the predetermined value does not fall within the threshold value, the end-abutting detection unit 90 may discard the steering angle θabt without using the steering angle θabt for determination of necessity of relearning.

Note that in the processing in a case where the end-abutting steering angle θabt is acquired when the steering wheel 1 is steered to the left, the left virtual rack end position θevl in the above description is replaced by the right virtual rack end position θevr.

In the following description, an end-abutting steering angle θabt acquired when the steering wheel 1 is steered to the left side is sometimes referred to as "left end-abutting steering angle", and an end-abutting steering angle θabt acquired when the steering wheel 1 is steered to the right side is sometimes referred to as "right end-abutting steering angle".

When, as illustrated in FIG. 13B, both a left end-abutting steering angle θabtl and a right end-abutting steering angle θabtr are acquired, the end-abutting detection unit 90 calculates an absolute value of a difference between the end-abutting steering angles θabtl and θabtr as the rack stroke approximate value Sta. The end-abutting detection unit 90 compares a minimum value of a rack stroke of a rack shaft that has a possibility of being mistakenly mounted on the vehicle (sometimes refer to as "erroneous stroke minimum value Sterr") with the rack stroke approximate value Sta. When the rack stroke approximate value Sta is greater than or equal to the erroneous stroke minimum value Sterr, the end-abutting detection unit 90 determines that the end-abutting steering angles θabtl and θabtr are valid. When the rack stroke approximate value Sta is less than the erroneous stroke minimum value Sterr, the end-abutting detection unit 90 determines that the detection of the end-abutting steering angle θabt is false detection. The end-abutting detection unit 90 outputs a determination result to the counting unit 92.

FIG. 11 is now referred to. The end-abutting steering angle range determination unit 91 determines whether or not variation in right end-abutting steering angles θabt that the end-abutting detection unit 90 acquired multiple times is less than or equal to a predetermined threshold value θtha3. Likewise, the end-abutting steering angle range determination unit 91 determines whether or not variation in left end-abutting steering angles θabt that the end-abutting detection unit 90 acquired multiple times is less than or equal to the predetermined threshold value θtha3.

Although a method for calculating variation in right end-abutting steering angles θabt will be described below with reference to FIGS. 14A to 14C, the same applies to a method for calculating variation in left end-abutting steering angles θabt.

Figure 14A:
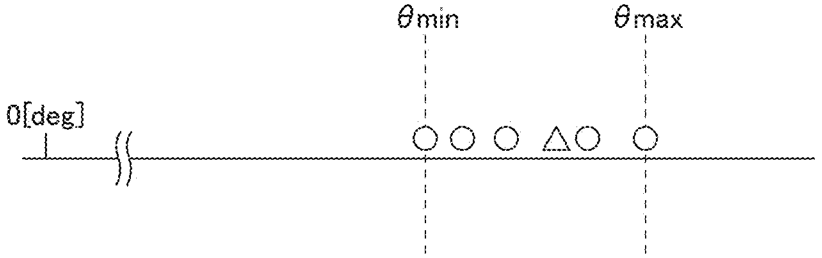
FIGS. 14A to 14C are explanatory diagrams of examples of end-abutting steering angle range determination.

FIG. 14A is now referred to. In FIG. 14A, a triangular mark indicates an end-abutting steering angle θabt that the end-abutting detection unit 90 acquired most recently. Hereinafter, an end-abutting steering angle θabt that the end-abutting detection unit 90 acquired most recently is sometimes referred to as "latest end-abutting steering angle". Circular marks indicate end-abutting steering angles θabt that the end-abutting detection unit 90 acquired at time points before the end-abutting detection unit 90 acquired the latest end-abutting steering angle θabt (the triangular mark) and that are stored in an end-abutting steering angle storage unit 94. Hereinafter, an end-abutting steering angle θabt that is stored in the end-abutting steering angle storage unit 94 is sometimes referred to as "stored end-abutting steering angle". The same applies to FIGS. 14B and 14C.

As illustrated in FIG. 14A, when a difference between a minimum value θmin and a maximum value θmax of the latest end-abutting steering angle θabt (the triangular mark) and the stored end-abutting steering angles θabt (the circular marks) is less than or equal to the predetermined threshold value θtha3, the end-abutting steering angle range determination unit 91 determines that variation in the end-abutting steering angles θabt is less than or equal to the predetermined threshold value θtha3. In this case, the end-abutting steering angle range determination unit 91 stores the latest end-abutting steering angle θabt (the triangular mark) in the end-abutting steering angle storage unit 94 in addition to the stored end-abutting steering angles θabt (the circular marks).

FIG. 11 is now referred to. The counting unit 92 counts the number of times that the end-abutting steering angle range determination unit 92 determines that variation in end-abutting steering angles θabt is less than or equal to the predetermined threshold value θtha3, every time the end-abutting detection unit 90 acquires an end-abutting steering angle θabt (a triangular mark). That is, the counting unit 92 counts the number of times of acquisition of an end-abutting steering angle that causes variation in end-abutting steering angles to be less than or equal to the predetermined threshold value θtha3.

The counting unit 92 includes a vehicle state determination unit 95, end-abutting counters 96*o*L, 96*o*R, 96*b*L, and 96*b*R, provisional end-abutting counters 97*o*L, 97*o*R, 97*b*L, and 97*b*R, and on-center counters 98*o*L, 98*o*R, 98*b*L, and 98*b*R.

In the following description, the end-abutting counters 96*o*L, 96*o*R, 96*b*L, and 96*b*R are collectively referred to as "end-abutting counter 96", the provisional end-abutting counters 97*o*L, 97*o*R, 97*b*L, and 97*b*R are collectively referred to as "provisional end-abutting counter 97", and the on-center counters 98*o*L, 98*o*R, 98*b*L, and 98*b*R are collectively referred to as "on-center counter 98".

Figure 15:
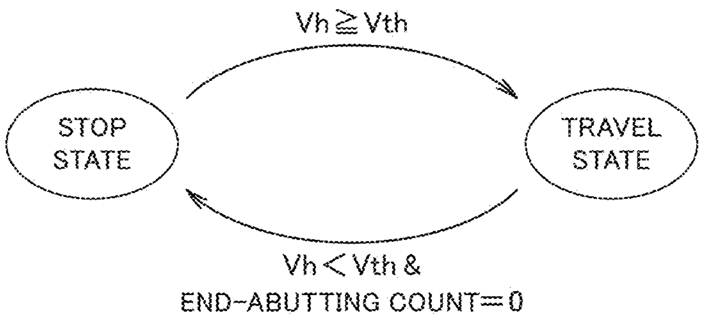
FIG. 15 is an example of a state transition diagram of a vehicle state.

The vehicle state determination unit 95 determines whether the vehicle is in a stop state or a travel state, based on the vehicle speed Vh detected by the vehicle speed sensor 12. FIG. 15 is an example of a state transition diagram of a vehicle state. When the vehicle speed Vh becomes greater than or equal to a vehicle speed threshold value Vth when the vehicle is in the stop state, the vehicle state determination unit 95 determines that the vehicle state has transitioned to the travel state. When the vehicle speed Vh becomes less than the vehicle speed threshold value Vth when the vehicle is in the travel state and a count value in the end-abutting counter 96 is "0", the vehicle state determination unit 95 determines that the vehicle state has transitioned to the stop state. Since the counting unit 92 includes four end-abutting counters 96*o*L, 96*o*R, 96*b*L, and 96*b*R as described above, the vehicle state determination unit 95 may determine whether or not the vehicle state has transitioned to the stop state with respect to each of the counters.

FIG. 11 is now referred to. The end-abutting counter 96 counts and stores the number of times that the end-abutting steering angle range determination unit 91 determines that variation in end-abutting steering angles θabt is less than or equal to the predetermined threshold value θtha3, every time the end-abutting detection unit 90 acquires an end-abutting steering angle θabt (a triangular mark) when the vehicle state is the travel state.

That is, when the end-abutting steering angle range determination unit 91 determines that a difference between a minimum value θmin and a maximum value θmax of a latest end-abutting steering angle θabt (a triangular mark) and stored end-abutting steering angles θabt (circular marks) is less than or equal to the predetermined threshold value θtha3 when the vehicle state is the travel state, the end-abutting counter 96 increments a count value by one.

On the other hand, the provisional end-abutting counter 97 counts the number of times that the end-abutting steering angle range determination unit 91 determines that variation in end-abutting steering angles θabt is less than or equal to the predetermined threshold value θtha3, every time the end-abutting detection unit 90 acquires an end-abutting steering angle θabt (a triangular mark) when the vehicle state is the stop state and stores a counted number.

That is, when the end-abutting steering angle range determination unit 91 determines that a difference between a minimum value θmin and a maximum value θmax of a latest end-abutting steering angle θabt (a triangular mark) and stored end-abutting steering angles θabt (circular marks) is less than or equal to the predetermined threshold value θtha3 when the vehicle state is the stop state, the provisional end-abutting counter 97 increments a count value by one.

The end-abutting counter 96*o*L and the provisional end-abutting counter 97*o*L are counters that count the number of times that the end-abutting steering angle range determination unit 91 determines that variation in left end-abutting steering angles θabt is less than or equal to the predetermined threshold value θtha3 when end-abutting occurs in the case of steering to the left side and no end-abutting occurs in the case of steering to the right side.

In addition, the end-abutting counter 96*o*R and the provisional end-abutting counter 97*o*R are counters that count the number of times that the end-abutting steering angle range determination unit 91 determines that variation in right end-abutting steering angles θabt is less than or equal to the predetermined threshold value θtha3 when no end-abutting occurs in the case of steering to the left side and end-abutting occurs in the case of steering to the right side.

In addition, the end-abutting counter 96*b*L and the provisional end-abutting counter 97*b*L are counters that count the number of times that the end-abutting steering angle range determination unit 91 determines that variation in left end-abutting steering angles θabt is less than or equal to the predetermined threshold value θtha3 when end-abutting occurs both in the case of steering to the left side and in the case of steering to the right side.

In addition, the end-abutting counter 96*b*R and the provisional end-abutting counter 97*b*R are counters that count the number of times that the end-abutting steering angle range determination unit 91 determines that variation in right end-abutting steering angles θabt is less than or equal to the predetermined threshold value θtha3 when end-abutting occurs both in the case of steering to the left side and in the case of steering to the right side.

When the vehicle state transitions from the stop state to the travel state, the counting unit 92 assigns a count value in the provisional end-abutting counter 97 to a count value in the end-abutting counter 96. That is, the counting unit 92 replaces the count value in the end-abutting counter 96 by the count value in the provisional end-abutting counter 97. In addition, the counting unit 92 resets the count value in the provisional end-abutting counter 97 to "0".

Figure 14B:
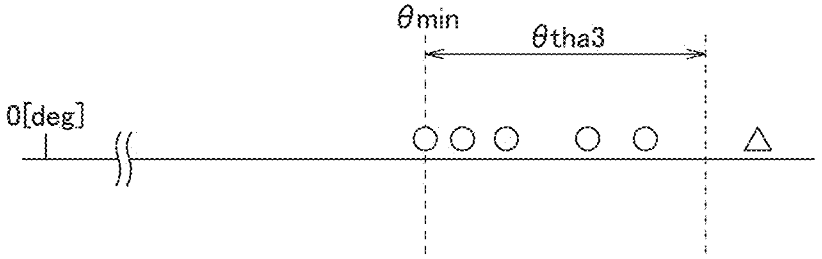
Figure 14C:
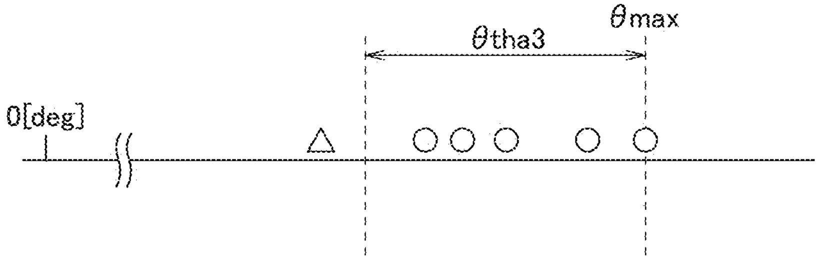

FIG. 14C is now referred to. When a latest end-abutting steering angle θabt (a triangular mark) is closer to a neutral position of the steering mechanism than stored end-abutting steering angles θabt (circular marks) and a difference between a maximum value θmax (that is, an end-abutting steering angle θabt farthest from the neutral position) of the stored end-abutting steering angles θabt (the circular marks) and the latest end-abutting steering angle θabt (the triangular mark) is greater than the predetermined threshold value θtha3, the end-abutting steering angle range determination unit 91 determines that variation in the end-abutting steering angles θabt is not less than or equal to the predetermined threshold value θtha3. Hereinafter, such a state is sometime referred to as "neutral-side deviation state".

When the latest end-abutting steering angle θabt (the triangular mark) is in the neutral-side deviation state, the end-abutting steering angle range determination unit 91 discards the latest end-abutting steering angle θabt (the triangular mark).

In addition, the on-center counter 98 counts the number of times that a latest end-abutting steering angle θabt (a triangular mark) is determined to be in the neutral-side deviation state and store the counted number. That is, when the end-abutting steering angle range determination unit 91 determines that a latest end-abutting steering angle θabt (a triangular mark) is in the neutral-side deviation state, the on-center counter 98 increments a count value by one.

The on-center counter 98oL is a counter that counts the number of times that the end-abutting steering angle range determination unit 91 determines that a left end-abutting steering angle θabt is in the neutral-side deviation state when end-abutting occurs in the case of steering to the left side and no end-abutting occurs in the case of steering to the right side.

The on-center counter 98oR is a counter that counts the number of times that the end-abutting steering angle range determination unit 91 determines that a right end-abutting steering angle θabt is in the neutral-side deviation state when no end-abutting occurs in the case of steering to the left side and end-abutting occurs in the case of steering to the right side.

The on-center counter 98bL is a counter that counts the number of times that the end-abutting steering angle range determination unit 91 determines that a left end-abutting steering angle θabt is in the neutral-side deviation state when end-abutting occurs both in the case of steering to the left side and in the case of steering to the right side.

The on-center counter 98bR is a counter that counts the number of times that the end-abutting steering angle range determination unit 91 determines that a right end-abutting steering angle θabt is in the neutral-side deviation state when end-abutting occurs both in the case of steering to the left side and in the case of steering to the right side.

When a count value in one of the on-center counters 98oL, 98oR, 98bL, and 98bR becomes greater than or equal to a predetermined threshold value, the end-abutting steering angle range determination unit 91 deletes left or right end-abutting steering angles θabt (circular marks) stored in the end-abutting steering angle storage unit 94. In addition, the counting unit 92 resets the count values in the end-abutting counters 96oL, 96oR, 96bL, and 96bR, the provisional end-abutting counters 97oL, 97oR, 97bL, and 97bR, and the on-center counters 98oL, 98oR, 98bL, and 98bR to "0".

FIG. 14B is now referred to. When an end-abutting steering angle θabt (a triangular mark) acquired most recently is located farther from the neutral position of the steering mechanism than stored end-abutting steering angles θabt (circular marks) and a difference between a minimum value θmin (that is, an end-abutting steering angle θabt closest to the neutral position) of the stored end-abutting steering angles θabt (the circular marks) and the end-abutting steering angle θabt (the triangular mark) acquired most recently is greater than the predetermined threshold value θtha3, the end-abutting steering angle range determination unit 91 determines that variation in the end-abutting steering angles θabt is not less than or equal to the predetermined threshold value θtha3. Hereinafter, such a state is sometime referred to as "end-side deviation state".

When a latest end-abutting steering angle θabt (a triangular mark) is in the end-side deviation state, the end-abutting steering angle range determination unit 91 deletes end-abutting steering angles θabt (circular marks) stored at time points before the latest end-abutting steering angle θabt (the triangular mark) is acquired from the end-abutting steering angle storage unit 94 and stores the latest end-abutting steering angle θabt (the triangular mark) in the end-abutting steering angle storage unit 94.

In addition, the counting unit 92 resets count values in the end-abutting counter 96, the provisional end-abutting counter 97, and the on-center counter 98 to "0". When the vehicle state is the travel state, the counting unit 92 increments the end-abutting counter 96 by one, and when the vehicle state is the stop state, the counting unit 92 increments the provisional end-abutting counter 97 by one.

Specifically, when end-abutting occurs in the case of steering to the left side and no end-abutting occurs in the case of steering to the right side and the latest end-abutting steering angle θabt (the triangular mark) is a left end-abutting steering angle θabt, the end-abutting steering angle range determination unit 91 deletes stored left end-abutting steering angles θabt (circular marks) from the end-abutting steering angle storage unit 94 and stores the latest left end-abutting steering angle θabt (the triangular mark) in the end-abutting steering angle storage unit 94. In addition, the counting unit 92 resets the count values in the end-abutting counter 96oL, the provisional end-abutting counter 97oL, and the on-center counter 98oL to "0". When the vehicle state is the travel state, the counting unit 92 increments the end-abutting counter 96oL by one, and when the vehicle state is the stop state, the counting unit 92 increments the provisional end-abutting counter 97oL by one.

In addition, when no end-abutting occurs in the case of steering to the left side and end-abutting occurs in the case of steering to the right side and the latest end-abutting steering angle θabt (the triangular mark) is a right end-abutting steering angle θabt, the end-abutting steering angle range determination unit 91 deletes stored right end-abutting steering angles θabt (circular marks) from the end-abutting steering angle storage unit 94 and stores the latest right end-abutting steering angle θabt (the triangular mark) in the end-abutting steering angle storage unit 94. In addition, the counting unit 92 resets the count values in the end-abutting counter 96oR, the provisional end-abutting counter 97oR, and the on-center counter 98oR to "0". When the vehicle state is the travel state, the counting unit 92 increments the end-abutting counter 96oR by one, and when the vehicle state is the stop state, the counting unit 92 increments the provisional end-abutting counter 97oR by one.

In addition, when end-abutting occurs both in the case of steering to the left side and in the case of steering to the right side and the latest end-abutting steering angle θabt (the triangular mark) is a left end-abutting steering angle θabt, the end-abutting steering angle range determination unit 91 deletes stored left end-abutting steering angles θabt (circular marks) from the end-abutting steering angle storage unit 94 and stores the latest left end-abutting steering angle θabt (the triangular mark) in the end-abutting steering angle storage unit 94. In addition, the counting unit 92 resets the count values in the end-abutting counter 96bL, the provisional end-abutting counter 97bL, and the on-center counter 98bL to "0". When the vehicle state is the travel state, the counting unit 92 increments the end-abutting counter 96bL by one, and when the vehicle state is the stop state, the counting unit 92 increments the provisional end-abutting counter 97bL by one.

In addition, when end-abutting occurs both in the case of steering to the left side and in the case of steering to the right side and the latest end-abutting steering angle θabt (the triangular mark) is a right end-abutting steering angle θabt, the end-abutting steering angle range determination unit 91 deletes stored right end-abutting steering angles θabt (circular marks) from the end-abutting steering angle storage unit 94 and stores the latest right end-abutting steering angle θabt (the triangular mark) in the end-abutting steering angle storage unit 94. In addition, the counting unit 92 resets the count values in the end-abutting counter 96*b*R, the provisional end-abutting counter 97*b*R, and the on-center counter 98*b*R to "0". When the vehicle state is the travel state, the counting unit 92 increments the end-abutting counter 96*b*R by one, and when the vehicle state is the stop state, the counting unit 92 increments the provisional end-abutting counter 97*b*R by one.

When end-abutting occurs both in the case of steering to the left side and in the case of steering to the right side, the counting unit 92 receives a determination result of comparison between a rack stroke approximate value Sta (FIG. 13B) that the end-abutting detection unit 90 calculates, as an absolute value of a difference between the left and right end-abutting steering angles θabt and the erroneous stroke minimum value Sterr, from the end-abutting detection unit 90.

When the rack stroke approximate value Sta is less than the erroneous stroke minimum value Sterr, the counting unit 92 determines that false detection of an end-abutting steering angle θabt has occurred and saves the count values in the end-abutting counters 96*b*L and 96*b*R in the provisional end-abutting counters 97*b*L and 97*b*R. That is, the counting unit 92 replaces the count values in the provisional end-abutting counters 97*b*L and 97*b*R by the count values in the end-abutting counters 96*b*L and 96*b*R, respectively and resets the count values in the end-abutting counters 96*b*L and 96*b*R to "0".

Subsequently, when the vehicle state transitions to the travel state in the determination processing of the vehicle state and the detection of the end-abutting steering angle θabt is determined to be reliable, the count values in the provisional end-abutting counters 97*b*L and 97*b*R are returned to the end-abutting counters 96*b*L and 96*b*R, respectively.

Note that variation in a latest end-abutting steering angle θabt (a triangular mark) and stored end-abutting steering angles θabt (circular marks) being less than or equal to the predetermined threshold value θtha3 as illustrated in FIG. 14A is sometimes referred to as "an end-abutting steering angle θabt acquired most recently falls within the predetermined variation range θtha3" in the following description. In addition, a latest end-abutting steering angle θabt (a triangular mark) being in the end-side deviation state or the neutral-side deviation state as illustrated in FIG. 14B or FIG. 14C is sometimes referred to as "an end-abutting steering angle θabt acquired most recently falls outside the predetermined variation range θtha3" in the following description.

FIG. 11 is now referred to. The relearning unit 93 determines necessity of relearning of one of the virtual rack end positions θev, based on a count value in the end-abutting counter 96, and when the relearning of the virtual rack end position θev is to be performed, the relearning unit 93 outputs a relearning command signal Cmd to the terminal position learning unit 46.

For example, when a count value in the end-abutting counter 96 exceeds a predetermined threshold value, the relearning unit 93 determines that relearning of a corresponding virtual rack end position θev is necessary and outputs a relearning command signal Cmd.

For example, when end-abutting occurs in the case of steering to the left side and no end-abutting occurs in the case of steering to the right side and the count value in the end-abutting counter 96*o*L for the left side exceeds the predetermined threshold value, the relearning unit 93 may output a relearning command signal Cmd commanding relearning of the left virtual rack end position θevl to the terminal position learning unit 46. The terminal position learning unit 46 resets the left virtual rack end position θevl to the initial value −θint in accordance with the relearning command signal Cmd. Because of this configuration, the terminal position learning unit 46 relearns the left virtual rack end position θevl.

In addition, for example, when no end-abutting occurs in the case of steering to the left side and end-abutting occurs in the case of steering to the right side and the count value in the end-abutting counter 96*o*R for the right side exceeds the predetermined threshold value, the relearning unit 93 may output a relearning command signal Cmd commanding relearning of the right virtual rack end position θevr to the terminal position learning unit 46. The terminal position learning unit 46 resets the right virtual rack end position θevr to the initial value θint in accordance with the relearning command signal Cmd. Because of this configuration, the terminal position learning unit 46 relearns the right virtual rack end position θevr.

In addition, for example, when end-abutting occurs both in the case of steering to the left side and in the case of steering to the right side and a sum of the count value in the end-abutting counter 96*b*L for the left side and the count value in the end-abutting counter 96*b*R for the right side is greater than or equal to a predetermined threshold value, the relearning unit 93 calculates the rack stroke minimum value Stmin, the rack stroke maximum value Stmax, the learning threshold value θlth, the rack end maximum value θevmax, and the initial value θint, which are set values used for the learning of the virtual rack end positions θev, based on end-abutting steering angles θabt stored in the end-abutting steering angle storage unit 94 of the end-abutting steering angle range determination unit 91.

Figure 16:
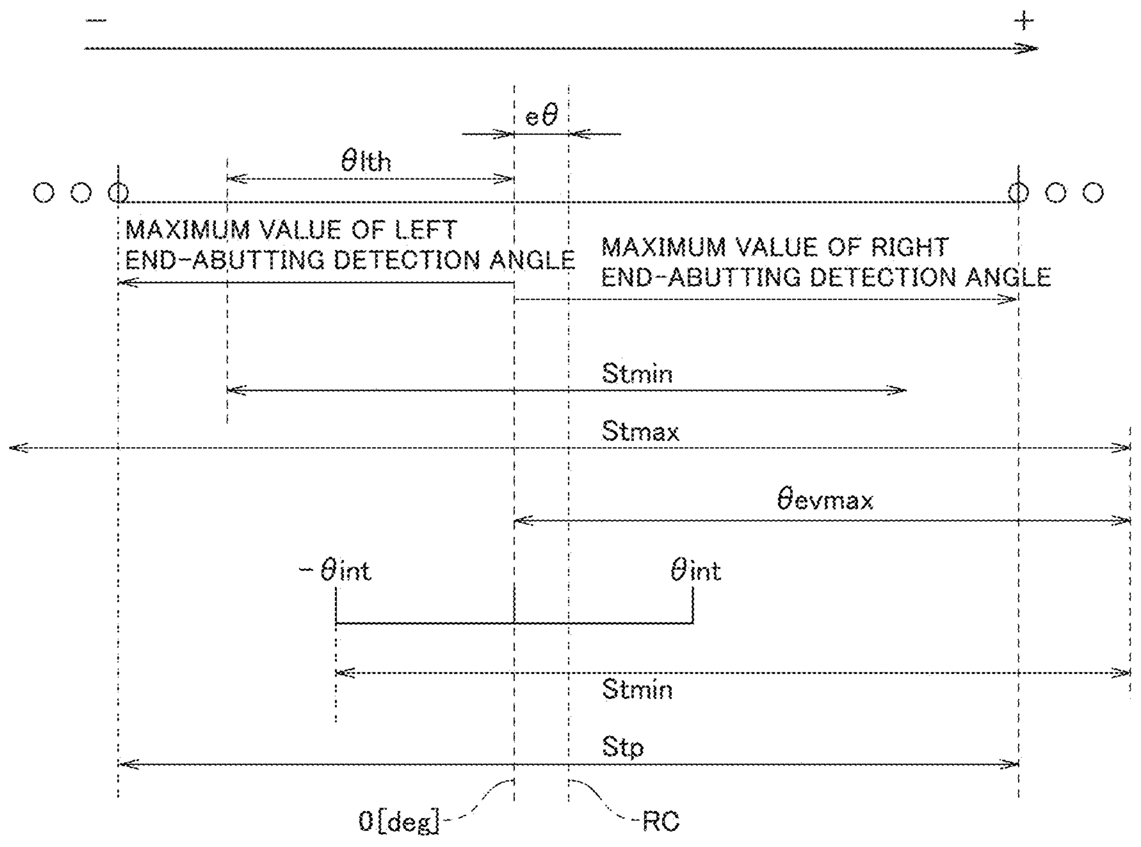
FIG. 16 is an explanatory diagram of an example of a method for calculating a rack stroke minimum value Stmin, a rack stroke maximum value Stmax, a learning threshold value θlth, a rack end maximum value θevmax, and an initial value θint.

With reference to FIG. 16, an example of a method for calculating the rack stroke minimum value Stmin, the rack stroke maximum value Stmax, the learning threshold value θlth, the rack end maximum value θevmax, and the initial value θint will be described. Note that in FIG. 16, a reference sign "RC" denotes a center position between the left and right rack ends, and "0 [deg]" denotes a position at which the steering angle θh detected by the steering angle sensor 14 is "0".

The relearning unit 93 calculates a sum of an absolute value of a maximum value of left end-abutting steering angles θabt (that is, a left end-abutting steering angle θabt among the left end-abutting steering angles θabt that is closest to the neutral position) and an absolute value of a minimum value of right end-abutting steering angles θabt (that is, a right end-abutting steering angle θabt among the right end-abutting steering angles θabt that is closest to the neutral position) as a provisional stroke Stp=|max (left end-abutting steering angles θabt)|+|min(right end-abutting steering angles θabt)|.

Next, the relearning unit 93 calculates a half of an absolute value of a difference between the absolute value of the maximum value of the left end-abutting steering angles θabt and the absolute value of the minimum value of the right end-abutting steering angles θabt as a provisional assembly error eθ=||max (left end-abutting steering angles θabt)|−|min(right end-abutting steering angles θabt)||/2.

The relearning unit 93 calculates a subtraction result obtained by subtracting predetermined thermal expansion/contraction error of a manual steering gear and learning error from the provisional stroke Stp as a rack stroke minimum value Stmin=Stp−(thermal expansion/contraction error of manual steering gear)−(learning error).

The relearning unit 93 calculates an addition result obtained by adding the predetermined thermal expansion/contraction error of the manual steering gear, the learning error, and sensor error to the provisional stroke Stp as a rack stroke maximum value Stmax=Stp+(thermal expansion/contraction error of manual steering gear)+(learning error)+(sensor error).

The relearning unit 93 calculates a sum of a half of the rack stroke maximum value Stmax and the provisional assembly error eθ as a rack end maximum value θevmax=(Stmax/2+eθ).

The relearning unit 93 calculates a subtraction result obtained by subtracting the rack end maximum value θevmax from the rack stroke minimum value Stmin as an initial value θint=(Stmin−θevmax).

The relearning unit 93 calculates a subtraction result obtained by subtracting the provisional assembly error eθ from a half of the rack stroke minimum value Stmin as a learning threshold value θlth=Stmin/2−(provisional assembly error eθ).

The relearning unit 93 outputs the calculated initial value θint and rack stroke maximum value Stmax to the terminal position learning unit 46. In addition, the relearning unit 93 outputs the calculated rack stroke maximum value Stmax, rack stroke minimum value Stmin, and learning threshold value θlth to the learning state determination unit 51. The relearning unit 93 may be configured to be able to output the rack end maximum value θevmax.

The terminal position learning unit 46 updates the initial values θint of the virtual rack end positions θevr and θevl at the time of learning start to values that the relearning unit 93 recalculated. The terminal position learning unit 46 updates the rack stroke maximum value Stmax to be used for determination of offset error to a value that the relearning unit 93 recalculated.

In addition, the learning state determination unit 51 updates the rack stroke maximum value Stmax, the rack stroke minimum value Stmin, and the learning threshold value θlth to be used for determination of a learning state to values that the relearning unit 93 recalculated.

The relearning unit 93 may output a relearning command signal Cmd commanding relearning of the left virtual rack end position θevl and the right virtual rack end position θevr to the terminal position learning unit 46. The terminal position learning unit 46 resets the left virtual rack end position θevl to the initial value −θint and resets the right virtual rack end position θevr to the initial value θint in accordance with the relearning command signal Cmd. Because of this configuration, the terminal position learning unit 46 relearns the left virtual rack end position θevl and the right virtual rack end position θevr.

(Operation)

Figure 17:
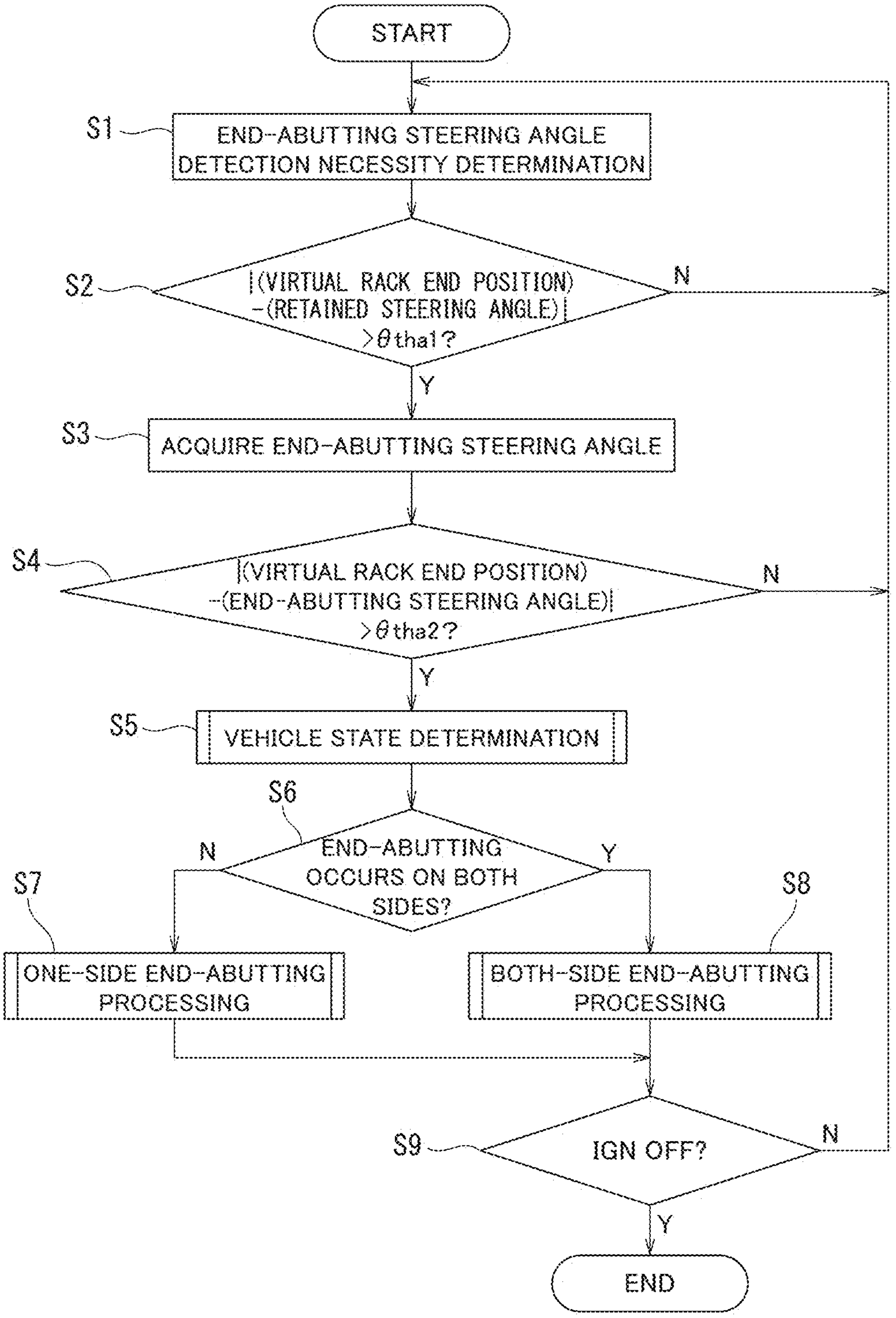
FIG. 17 is a flowchart of an example of a turning control method of the embodiment.

FIG. 17 is a flowchart of an example of a turning control method of the embodiment.

In step S1, the end-abutting detection unit 90 retains a steering angle θdt when the steering torque Th is greater than or equal to a predetermined threshold value Tth1.

In step S2, the end-abutting detection unit 90 determines whether or not an absolute value |θev−θdt| of a difference between the retained steering angle θdt and one of the virtual rack end positions θev is greater than the steering angle threshold value θtha1. When the absolute value |θev−θdt| is not greater than the steering angle threshold value θtha1 (step S2: N), the process returns to step S1. When the absolute value |θev−θdt| is greater than the steering angle threshold value θtha1 (step S2: Y), the process proceeds to step S3.

In step S3, the end-abutting detection unit 90 retains an end-abutting steering angle candidate θcd when, after the steering torque Th has become greater than or equal to the predetermined threshold value Tth1, the column output shaft torque Tc becomes less than the predetermined threshold value Tth2 and the steering torque Th becomes less than the predetermined threshold value Tth1.

In step S4, the end-abutting detection unit 90 determines whether or not an absolute value |θev−θcd| of a difference between an end-abutting steering angle candidate θcd and the virtual rack end position θev is greater than the steering angle threshold value θtha2. When the absolute value |θev−θcd| is not greater than the steering angle threshold value θtha2 (step S4: N), the process returns to step S1. When the absolute value |θev−θcd| is greater than the steering angle threshold value θtha2 (step S4: Y), the process proceeds to step S5.

In step S5, the vehicle state determination unit 95 determines whether the vehicle is in the stop state or the travel state. When the vehicle state transitions from the stop state to the travel state, the counting unit 92 assigns a count value in the provisional end-abutting counter 97 to count value in the end-abutting counter 96. In addition, the counting unit 92 resets the count value in the provisional end-abutting counter 97 to “0”.

In step S6, the end-abutting detection unit 90 determines whether or not end-abutting occurs both in the case of the steering wheel 1 being steered to the left side and in the case of being steered to the right side. When end-abutting occurs both in the case of steering to the left side and in the case of steering to the right side (step S6: Y), the process proceeds to step S8. When end-abutting occurs only either in the case of steering to the left side or in the case of steering to the right side (step S6: N), the process proceeds to step S7.

In step S7, the relearning determination unit 53 performs one-side end-abutting processing. Details of the one-side end-abutting processing will be described later with reference to FIG. 18. Subsequently, the process proceeds to step S9.

In step S8, the relearning determination unit 53 performs both-side end-abutting processing. Details of the both-side end-abutting processing will be described later with reference to FIG. 19. Subsequently, the process proceeds to step S9.

In step S9, the controller 30 determines whether or not the IGN key 11 is turned off. When the IGN key 11 is not turned off (step S9: N), the process returns to step S1. When the IGN key 11 is turned off (step S9: Y), the process terminates.

Figure 18:
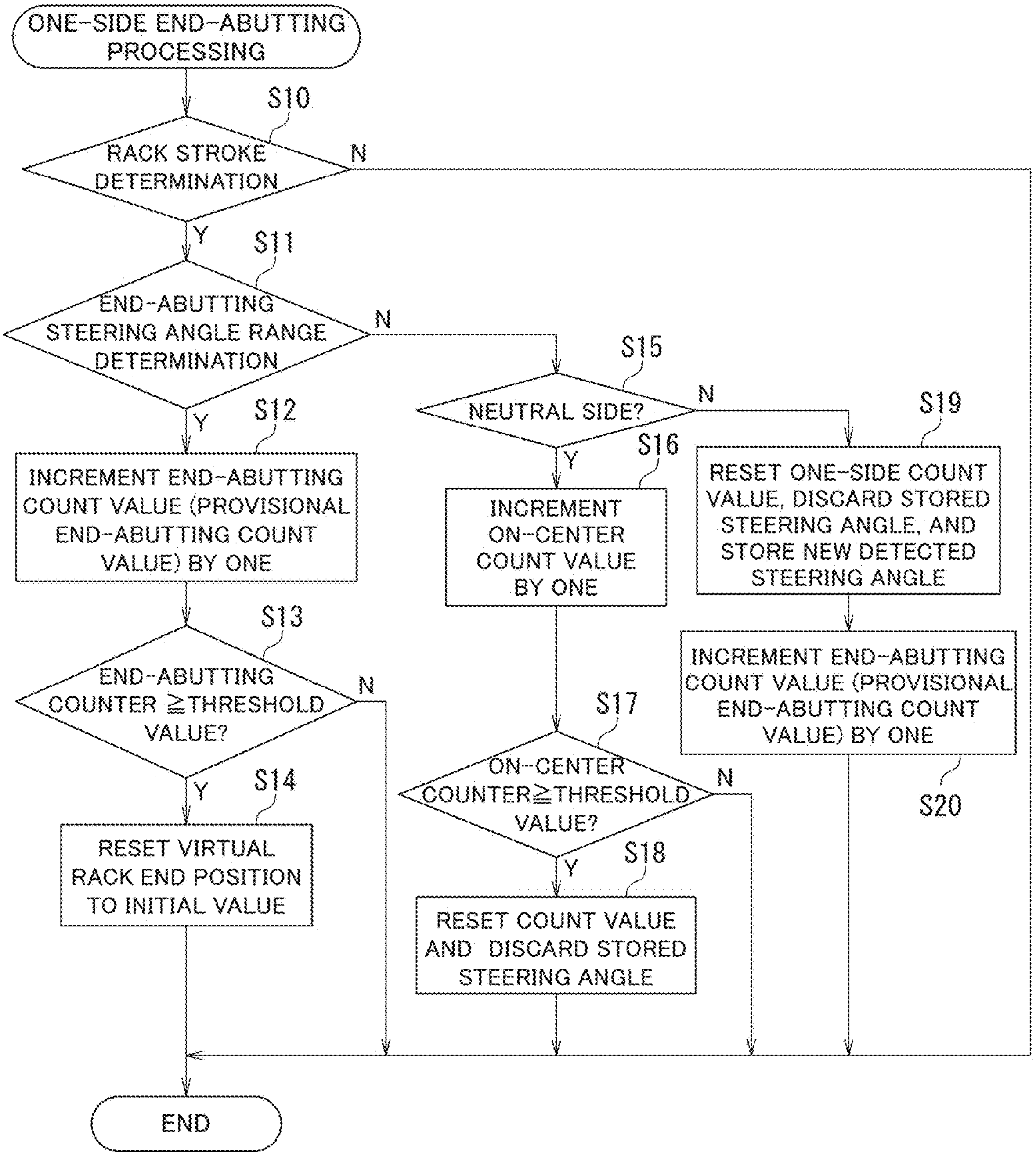
FIG. 18 is a flowchart of an example of one-side end-abutting processing in FIG. 17.

FIG. 18 is a flowchart of an example of the one-side end-abutting processing (S7) in FIG. 17. The one-side end-abutting processing is performed independently when end-abutting occurs in the case of steering to the right side (that is, a right end-abutting steering angle θabt is acquired) and when end-abutting occurs in the case of steering to the left side (that is, a left end-abutting steering angle θabt is acquired).

In step S10, the end-abutting detection unit 90 calculates a rack stroke approximate value Sta, based on an end-abutting steering angle θabt acquired most recently. For example, when a right end-abutting steering angle θabt is acquired, the end-abutting detection unit 90 calculates an absolute value of a difference between the left virtual rack end position θevl and the right end-abutting steering angle θabt as the rack stroke approximate value Sta. When a left end-abutting steering angle θabt is acquired, the end-abutting detection unit 90 calculates an absolute value of a difference between the right virtual rack end position θevr and the left end-abutting steering angle θabt as the rack stroke approximate value Sta. When error between the rack stroke approximate value Sta and a predetermined value does not fall within a threshold value (step S10: N), the one-side end-abutting processing is terminated. When the error between the rack stroke approximate value Sta and the predetermined value falls within the threshold value (step S10: Y), the process proceeds to step S11.

In step S11, the end-abutting steering angle range determination unit 91 determines whether or not an end-abutting steering angle θabt acquired most recently falls within a predetermined variation range θtha3. When the end-abutting steering angle θabt acquired most recently falls outside the predetermined variation range θtha3 (step S11: N), the process proceeds to step S15. When the end-abutting steering angle θabt acquired most recently falls within the predetermined variation range θtha3 (step S11: Y), the process proceeds to step S12.

In step S12, the counting unit 92 increments a count value in the end-abutting counter 96 or the provisional end-abutting counter 97 by one. Specifically, when the vehicle is in the travel state and a left end-abutting steering angle θabt is acquired, the counting unit 92 increments a count value in the end-abutting counter 96_o_L by one. When the vehicle is in the travel state and a right end-abutting steering angle θabt is acquired, the counting unit 92 increments a count value in the end-abutting counter 96_o_R by one. When the vehicle is in the stop state and a left end-abutting steering angle θabt is acquired, the counting unit 92 increments a count value in the end-abutting counter 97_o_L by one. When the vehicle is in the stop state and a right end-abutting steering angle θabt is acquired, the counting unit 92 increments a count value in the end-abutting counter 97_o_R by one.

In step S13, the relearning unit 93 determines whether or not a count value in the end-abutting counters 96 exceeds a predetermined threshold value. When a count value in the end-abutting counter 96 does not exceed the predetermined threshold value (step S13: N), the one-side end-abutting processing is terminated. When a count value in the end-abutting counter 96 exceeds the predetermined threshold value (step S13: Y), the process proceeds to step S14.

In step S14, the relearning unit 93 outputs a relearning command signal Cmd to the terminal position learning unit 46.

Specifically, when the count value in the left end-abutting counter 96_o_L exceeds the predetermined threshold value, the relearning unit 93 outputs a relearning command signal Cmd commanding relearning of the left virtual rack end position θevl. The terminal position learning unit 46 resets the left virtual rack end position θevl to an initial value −θint in accordance with the relearning command signal Cmd. When the count value in the right end-abutting counter 96_o_R exceeds the predetermined threshold value, the relearning unit 93 outputs a relearning command signal Cmd commanding relearning of the right virtual rack end position θevr. The terminal position learning unit 46 resets the right virtual rack end position θevr to an initial value θint in accordance with the relearning command signal Cmd. Subsequently, the one-side end-abutting processing is terminated.

In step S15, the end-abutting steering angle range determination unit 91 determines whether or not the end-abutting steering angle θabt acquired most recently is in the neutral-side deviation state. When the end-abutting steering angle θabt acquired most recently is in the end-side deviation state (step S15: N), the process proceeds to step S19. When the end-abutting steering angle θabt acquired most recently is in the neutral-side deviation state (step S15: Y), the process proceeds to step S16.

In step S16, the counting unit 92 increments a count value in the on-center counter 98 by one. Specifically, when the end-abutting steering angle θabt acquired most recently is a left end-abutting steering angle θabt, the counting unit 92 increments the count value in the on-center counter 98_o_L by one, and when the end-abutting steering angle θabt acquired most recently is a right end-abutting steering angle θabt, the counting unit 92 increments the count value in the on-center counter 98_o_R by one.

In step S17, the counting unit 92 determines whether or not the count value in either the on-center counters 98_o_L or 98_o_R is greater than or equal to the predetermined threshold value. When neither count value is greater than or equal to the threshold value (step S17: N), the one-side end-abutting processing is terminated. When the count value in either the end-abutting counters 98_o_L or 98_o_R is greater than or equal to the threshold value (step S17: Y), the process proceeds to step S18.

In step S18, the counting unit 92 resets the count values in the end-abutting counters 96_o_L, 96_o_R, 96_b_L, and 96_b_R, the provisional end-abutting counters 97_o_L, 97_o_R, 97_b_L, and 97_b_R, and the on-center counters 98_o_L, 98_o_R, 98_b_L, and 98_b_R to "0". In addition, the end-abutting steering angle range determination unit 91 deletes the left or right end-abutting steering angles θabt stored in the end-abutting steering angle storage unit 94. Subsequently, the one-side end-abutting processing is terminated.

In step S19, the counting unit 92 resets the end-abutting counter 96_o_L and the provisional end-abutting counter 97_o_L or the end-abutting counter 96_o_R and the provisional end-abutting counter 97_o_R to "0", depending on which one of left and right end-abutting steering angles θabt is in the end-side deviation state. In addition, the end-abutting steering angle range determination unit 91 deletes one of the left and right end-abutting steering angles θabt stored in the end-abutting steering angle storage unit 94. Specifically, when a left end-abutting steering angle θabt is in the end-side deviation state, the counting unit 92 resets the end-abutting counter 96_o_L and the provisional end-abutting counter 97_o_L to "0" and the end-abutting steering angle range determination unit 91 deletes the left end-abutting steering angle θabt. When a right end-abutting steering angle θabt is in the end-side deviation state, the counting unit 92 resets the end-abutting counter 96_o_R and the provisional end-abutting counter 97_o_R to "0" and the end-abutting steering angle range determination unit 91 deletes the right end-abutting steering angle θabt.

Processing in step S20 is the same as the processing in step S12. Subsequently, the one-side end-abutting processing is terminated.

Figure 19:
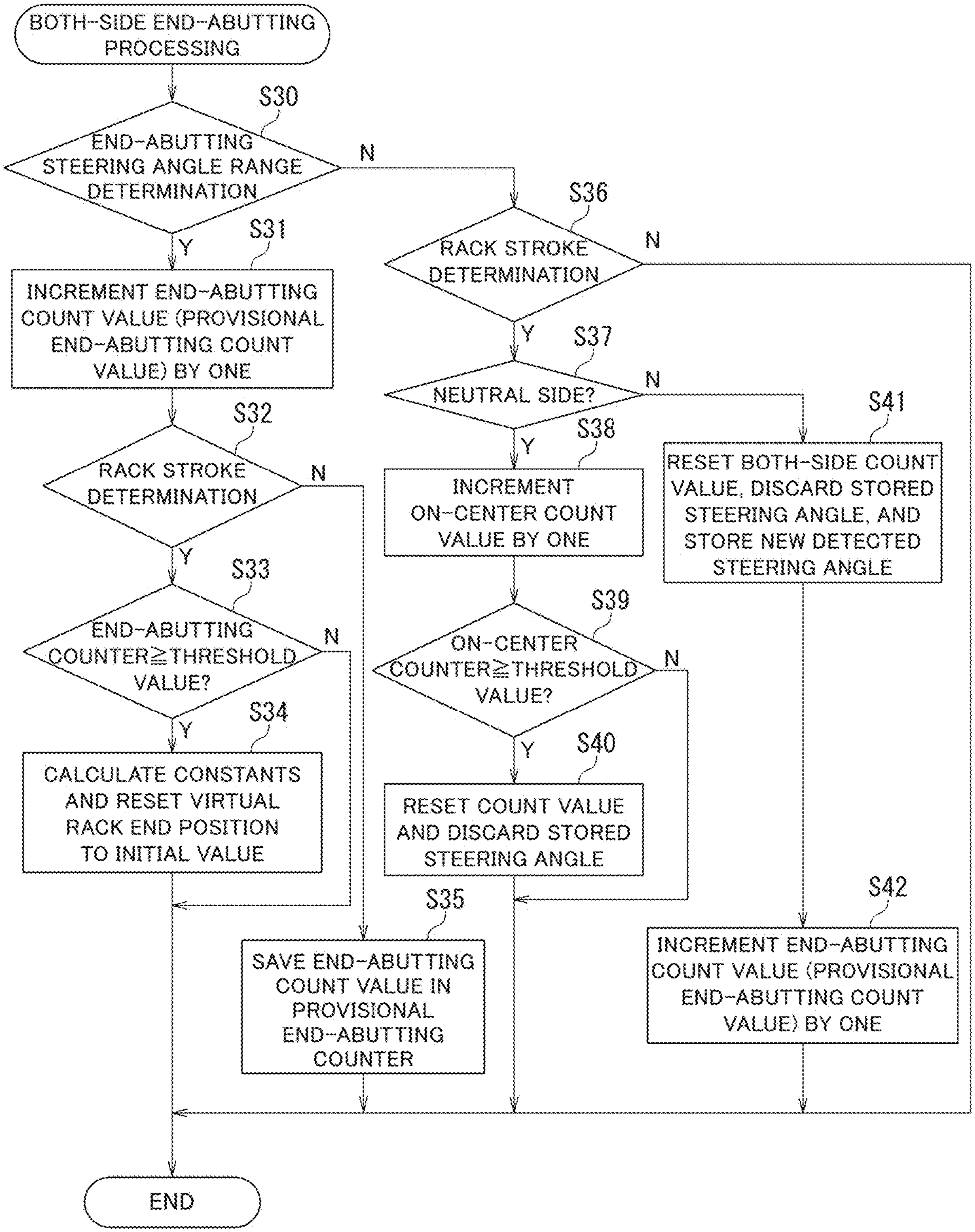
FIG. 19 is a flowchart of an example of both-side end-abutting processing in FIG. 17.

FIG. 19 is a flowchart of an example of the both-side end-abutting processing (S8) in FIG. 17.

In step S30, the end-abutting steering angle range determination unit 91 determines whether or not an end-abutting steering angle θabt acquired most recently falls within a predetermined variation range θtha3. When the end-abutting steering angle θabt acquired most recently falls outside the predetermined variation range θtha3 (step S30: N), the process proceeds to step S36. Note that processing in steps S36 to S42 is performed independently when end-abutting occurs in the case of steering to the right side (that is, a right end-abutting steering angle θabt is acquired) and when end-abutting occurs in the case of steering to the left side (that is, a left end-abutting steering angle θabt is acquired).

In contrast, when the end-abutting steering angle θabt acquired most recently falls within the predetermined variation range θtha3 (step S30: Y), the process proceeds to step S31.

In step S31, the counting unit 92 increments a count value in the end-abutting counter 96 or the provisional end-abutting counter 97 by one. Specifically, when the vehicle is in the travel state and a left end-abutting steering angle θabt is acquired, the counting unit 92 increments a count value in the end-abutting counter 96*b*L by one. When the vehicle is in the travel state and a right end-abutting steering angle θabt is acquired, the counting unit 92 increments a count value in the end-abutting counter 96*b*R by one. Specifically, when the vehicle is in the stop state and a left end-abutting steering angle θabt is acquired, the counting unit 92 increments a count value in the end-abutting counter 97*b*L by one. When the vehicle is in the stop state and a right end-abutting steering angle θabt is acquired, the counting unit 92 increments a count value in the end-abutting counter 97*b*R by one.

In step S32, the end-abutting detection unit 90 calculates an absolute value of a difference between the left and right end-abutting steering angles θabt as a rack stroke approximate value Sta. For example, the end-abutting detection unit 90 may calculate an absolute value of a difference between a minimum value of stored right end-abutting steering angles θabt (that is, a right end-abutting steering angle θabt among the stored right end-abutting steering angles θabt that is closest to the neutral position) and a maximum value of stored left end-abutting steering angles θabt (that is, a left end-abutting steering angle θabt among the stored left end-abutting steering angles θabt that is closest to the neutral position) as a rack stroke approximate value Sta=|min(right end-abutting steering angles θabt)−max (left end-abutting steering angles θabt)|. When the rack stroke approximate value Sta is not greater than or equal to the erroneous stroke minimum value Sterr (step S32: N), the process proceeds to step S35. When the rack stroke approximate value Sta is greater than or equal to the erroneous stroke minimum value Sterr (step S32: Y), the process proceeds to step S33.

In step S33, the relearning unit 93 determines whether or not a sum of the count value in the end-abutting counter 96*b*L and the count value in the end-abutting counter 96*b*R exceeds a predetermined threshold value. When the sum of the count values is not greater than or equal to the threshold value (step S33: N), the both-side end-abutting processing is terminated. When the sum of the count values is greater than or equal to the threshold value (step S33: Y), the process proceeds to step S34.

In step S34, the relearning unit 93 calculates setting values to be used for learning of the virtual rack end positions θev (the rack stroke minimum value Stmin, the rack stroke maximum value Stmax, the learning threshold value θlth, the rack end maximum value θevmax, and the initial value θint). The relearning unit 93 outputs the calculated initial value θint and rack stroke maximum value Stmax to the terminal position learning unit 46 and outputs the calculated rack stroke maximum value Stmax, rack stroke minimum value Stmin, and learning threshold value θlth to the learning state determination unit 51. The terminal position learning unit 46 and the learning state determination unit 51 update the setting values to values received from the relearning unit 93.

The relearning unit 93 outputs a relearning command signal Cmd to the terminal position learning unit 46. The terminal position learning unit 46 resets the left virtual rack end position θevl to the initial value −θint and resets the right virtual rack end position θevr to the initial value θint in accordance with the relearning command signal Cmd. Subsequently, the both-side end-abutting processing is terminated.

In step S35, the counting unit 92 saves the count values in the end-abutting counters 96*b*L and 96*b*R in the provisional end-abutting counters 97*b*L and 97*b*R. Subsequently, the both-side end-abutting processing is terminated.

In step S36, the end-abutting detection unit 90 calculates an absolute value of a difference between the left and right end-abutting steering angles θabt as a rack stroke approximate value Sta. When the rack stroke approximate value Sta is not greater than or equal to the erroneous stroke minimum value Sterr (step S36: N), the both-side end-abutting processing is terminated. When the rack stroke approximate value Sta is greater than or equal to the erroneous stroke minimum value Sterr (step S36: Y), the process proceeds to step S37.

In step S37, the end-abutting steering angle range determination unit 91 determines whether or not the end-abutting steering angle θabt acquired most recently is in the neutral-side deviation state. When the end-abutting steering angle θabt acquired most recently is in the end-side deviation state (step S37: N), the process proceeds to step S41. When the end-abutting steering angle θabt acquired most recently is in the neutral-side deviation state (step S37: Y), the process proceeds to step S38.

In step S38, the counting unit 92 increments a count value in the on-center counter 98 by one. Specifically, when the end-abutting steering angle θabt acquired most recently is a left end-abutting steering angle θabt, the counting unit 92 increments the count value in the on-center counter 98*b*L by one, and when the end-abutting steering angle θabt acquired most recently is a right end-abutting steering angle θabt, the counting unit 92 increments the count value in the on-center counter 98*b*R by one.

In step S39, the counting unit 92 determines whether or not the count value in either the on-center counters 98*b*L or 98*b*R is greater than or equal to the predetermined threshold value. When neither count value is greater than or equal to the threshold value (step S39: N), the both-side end-abutting processing is terminated. When the count value in either the end-abutting counters 98*o*L or 98*o*R is greater than or equal to the threshold value (step S38: Y), the process proceeds to step S40.

Processing in step S40 is the same as the processing in step S18 in FIG. 18. Subsequently, the both-side end-abutting processing is terminated.

In step S41, the counting unit 92 resets either the end-abutting counter 96*b*L and the provisional end-abutting counter 97*b*L or the end-abutting counter 96*b*R and the provisional end-abutting counter 97*b*R to "0", depending on which one of the left and right end-abutting steering angle θabt is in the end-side deviation state. In addition, the end-abutting steering angle range determination unit 91 deletes one of the left and right end-abutting steering angles θabt stored in the end-abutting steering angle storage unit 94. Specifically, when the left end-abutting steering angle θabt is in the end-side deviation state, the counting unit 92 resets the end-abutting counter 96*b*L and the provisional end-abutting counter 97*b*L to "0" and the end-abutting steering angle range determination unit 91 deletes the left end-abutting steering angle θabt. When the right end-abutting steering angle θabt is in the end-side deviation state, the counting unit 92 resets the end-abutting counter 96*b*R and the provisional end-abutting counter 97*b*R to "0" and the end-abutting steering angle range determination unit 91 deletes the right end-abutting steering angle θabt.

Processing in step S42 is the same as the processing in step S31. Subsequently, the both-side end-abutting processing is terminated.

(Variations)

Although an embodiment in which the turning control device of the present invention is applied to the electric power steering device is described above, the turning control device of the present invention is widely applicable to a variety of turning control devices other than the electric power steering device as long as the turning control device is a turning control device that generates force to turn the steered wheels of a vehicle by an actuator. For example, the turning control device of the present invention may be applied to a steering device of a steer-by-wire (SBW) type in which the steering wheel and the steered wheels are mechanically separated from each other. In this case, the steering torque Th does not have to be added to the motor torque when the column output shaft torque Tc is calculated.

(1) The end-abutting detection unit 90 may correct an end-abutting steering angle θabt according to the amount of deformation of a mechanical part due to the column output shaft torque Tc. This configuration enables influence of torsion of the turning mechanism to be reduced. The amount of deformation can be calculated from the column output shaft torque Tc and rigidity (spring constant) of the mechanical part. The rigidity is a ratio of a change amount of the column output shaft torque Tc to a change amount of the steering angle θh at a point indicated by the reference sign θ1 or θ2 in FIGS. 7A and 7B and may be acquired through an experiment or the like.

Characteristics illustrated in FIGS. 7A and 7B changes due to viscous resistance, which depends on steering velocity. There is a possibility that the steering velocity influences a learned value of a rack end. It may be configured such that a change amount of the learned value of the rack end with respect to a change amount of the steering velocity is acquired through an experiment or the like and stored as steering velocity-correction amount characteristics and the end-abutting steering angle θabt is corrected based on the steering velocity and the steering velocity-correction amount characteristics.

(2) In the above-described embodiment, when the rack stroke St between the right and left virtual rack end positions θev exceeds the rack stroke maximum value Stmax, a virtual rack end position θev of a stroke end where no end-abutting is detected is reset in such a way that the rack stroke St coincides with the predetermined rack stroke minimum value. In place of the configuration, when one of the right and left virtual rack end positions θev exceeds the rack end maximum value θevmax, the other of the right and left virtual rack end positions θev may be reset in such a way that the rack stroke St coincides with the predetermined rack stroke minimum value.

Advantageous Effects of Embodiment (1) A turning control device includes: a position detection unit configured to detect a steered position of a turning mechanism of a vehicle; a terminal position learning unit configured to learn a terminal position of the turning mechanism, based on the steered position detected by the position detection unit; and a relearning determination unit configured to determine necessity of relearning of the terminal position. The relearning determination unit includes: an end-abutting detection unit configured to detect occurrence of end-abutting, the end-abutting being a state in which the turning mechanism is turned to the terminal position, and acquire an end-abutting steering angle, the end-abutting steering angle being a steering angle when occurrence of end-abutting is detected; an end-abutting steering angle range determination unit configured to determine whether or not variation in the end-abutting steering angles acquired multiple times is less than or equal to a predetermined threshold value; and a relearning unit configured to, when the variation is less than or equal to the predetermined threshold value, reset the learned terminal position to an initial value.

Because of this configuration, it is possible to prevent mistakenly detecting end-abutting due to rapid turning-back steering, collision of a tire with a curb, or the like before end-abutting actually occurs and relearning a terminal position. Thus, incorrect learning of a terminal position can be prevented.

(2) When occurrence of end-abutting is detected both in a case of steering to a left side and in a case of steering to a right side and each of variation in the end-abutting steering angles in the case of steering to the left side and variation in the end-abutting steering angles in the case of steering to the right side is less than or equal to the predetermined threshold value, the relearning unit may calculate estimated rack stroke, based on the end-abutting steering angles and reset the initial value, based on the estimated rack stroke.

Because of this configuration, when a rack shaft having a length different from length of a rack shaft that should be originally mounted is mistakenly mounted, a learning initial value can be set according to rack length of the rack shaft that is actually mounted.

(3) The turning control device may include a counting unit configured to count a number of times of acquisition of the end-abutting steering angles having variation less than or equal to the predetermined threshold value, and when the number of times of acquisition is greater than or equal to a first threshold number of times, the relearning unit may reset the learned terminal position to the initial value.

Because of this configuration, whether or not variation in the end-abutting steering angles is less than or equal to a predetermined threshold value can be determined more accurately.

(4) The steering angle range determination unit may store the acquired end-abutting steering angle and determine whether or not variation in the end-abutting steering angles is less than or equal to the predetermined threshold value, based on a difference between the stored end-abutting steering angle and a steering angle when occurrence of end-abutting is detected. The counting unit may reset counting of the number of times of acquisition when variation in the end-abutting steering angles is determined not to be less than or equal to the predetermined threshold value.

Because of this configuration, mistakenly relearning a terminal position when variation in the end-abutting steering angles is temporarily less than or equal to a predetermined threshold value can be prevented.

(5) The counting unit may count a number of times that it is determined that a second steering angle, the second steering angle being a steering angle when occurrence of end-abutting is detected, is closer to a neutral position of the turning mechanism than a first steering angle, the first steering angle being a steering angle located farthest from the neutral position among the stored end-abutting steering angles, and a difference between the first steering angle and the second steering angle is not less than or equal to the predetermined threshold value, as a number of times of being on-center, and when the number of times of being on-center is greater than or equal to a second threshold number of times, reset counting of the number of times of acquisition.

Because of this configuration, mistakenly relearning a terminal position while the steering wheel cannot be steered to an angle at which end-abutting actually occurs because a tire is in contact with a curb or the like can be prevented.

(6) The counting unit may include a count storage unit configured to retain a number of times that the end-abutting steering angle having variation less than or equal to the predetermined threshold value is acquired during a period when vehicle speed of a vehicle is greater than or equal to a vehicle speed threshold value, as a counted number of times of end-abutting and retain a number of times that the end-abutting steering angle having variation less than or equal to the predetermined threshold value is acquired during a period when the vehicle speed is less than a vehicle speed threshold value, as a provisional counted number of times and, when the vehicle speed changes from less than the vehicle speed threshold value to greater than or equal to the vehicle speed threshold value, assign a value of the provisional counted number of times to the counted number of times of end-abutting. When the counted number of times of end-abutting is greater than or equal to the first threshold number of times, the relearning unit may reset the learned terminal position to an initial value.

There are some cases where in the stop state, there is a possibility that a tire is in contact with a curb or the like and an end-abutting steering angle is mistakenly acquired before end-abutting actually occurs. Because of this configuration, deferring relearning until the vehicle transitions from the stop state to the travel state enables incorrect learning to be prevented.

(7) The end-abutting detection unit may, when no end-abutting occurs in a case of steering to one of the left side and the right side and end-abutting occurs in a case of steering to the other of the left side and the right side, calculate a rack stroke, based on the learned terminal position learned on the one of the left side and the right side and the end-abutting steering angle acquired on the other of the left side and the right side. When error of the calculated rack stroke does not fall within a predetermined allowable range, the end-abutting detection unit does not use the end-abutting steering angle acquired on the other of the left side and the right side for calculation of variation in the end-abutting steering angles.

When error of the rack stroke calculated based on the end-abutting steering angles does not fall within a predetermined allowable range, there is a possibility of erroneous detection of an end-abutting steering angle. Not using such an end-abutting steering angle enables incorrect learning to be prevented.

(8) The end-abutting detection unit may, when end-abutting occurs both in a case of steering to the left side and in a case of steering to the right side, calculate rack stroke, based on the end-abutting steering angles acquired in the case of steering to the left side and in the case of steering to the right side, and when the calculated rack stroke is less than a predetermined lower limit, assign a value of the counted number of times of end-abutting to the provisional counted number of times and resets a value of the counted number of times of end-abutting to 0.

When end-abutting occurs both in a case of steering to the left side and in a case of steering to the right side and the rack stroke calculated based on the end-abutting steering angles is less than a predetermined lower limit as described above, there is a possibility of erroneous detection of an end-abutting steering angle. Thus, moving a value of the counted number of times of end-abutting to the provisional counted number of times and temporarily deferring relearning enable incorrect learning to be prevented.

REFERENCE SIGNS LIST

1 Steering wheel
2*i* Column input shaft
2*o* Column output shaft
3 Reduction gear
4 Intermediate shaft
4*a*, 4*b* Universal joint
4*c* Shaft member
5 Pinion rack mechanism
5*a* Pinion
5*b* Rack
6*a*, 6*b* Tie rod
7*a*, 7*b* Hub unit
8L, 8R Steered wheel
10 Torque sensor
11 Ignition key
12 Vehicle speed sensor
13 Battery
14 Steering angle sensor
20 Motor
30 Controller
40 Basic command value calculation unit
41, 64 Adder
42, 82 Subtracter
43 Current control unit
44 PWM control unit
45 Inverter
46 Terminal position learning unit
47 Control rotational displacement setting unit
48 Differentiating unit
49 Impact mitigation control unit
50 Current detector
51 Learning state determination unit
52 Impact mitigation control output limiting unit
53 Relearning determination unit
60 Spring constant table
61, 63 Multiplier
62 Viscosity constant table
65 Inverter
66, 79 Limiter
70 Output shaft torque calculation unit
71 Selection unit

72 First storage unit
73, 77 Delay unit
74 Rate limiter
75 Corrected position calculation unit
76 Second storage unit
78 Third storage unit
80 Stroke calculation unit
81 Offset error calculation unit
83 Terminal position correction unit
90 End-abutting detection unit
91 End-abutting steering angle range determination unit
92 Counting unit
93 Relearning unit
94 End-abutting steering angle storage unit
95 Vehicle state determination unit
96*b*L, 96*b*R, 96*o*L, 96*o*R End-abutting counter
97*b*L, 97*b*R, 97*o*L, 97*o*R Provisional end-abutting counter
98*b*L, 98*b*R, 98*o*L, 98*o*R On-center counter

The invention claimed is:

1. A turning control device comprising:

a position detection unit, implemented by one or more processors, configured to detect a steered position of a turning mechanism of a vehicle;

a terminal position learning unit, implemented by the one or more processors, configured to learn a terminal position of the turning mechanism, based on the steered position detected by the position detection unit;

a relearning determination unit, implemented by the one or more processors, configured to determine necessity of relearning of the terminal position, the relearning determination unit includes:

an end-abutting detection unit, implemented by one or more processors, configured to:

detect end-abutting, the end-abutting being a state in which the turning mechanism is detected as turned to the terminal position, and acquire end-abutting steering angles, the end-abutting steering angles being respective ones of steering angle values when end-abutting is detected;

an end-abutting steering angle range determination unit, implemented by one or more processors, configured to:

determine a variation between a first steering angle value and a second steering angle value, the first steering angle value representing a first one of the steering angle values of a first one of the end-abutting steering angles, the second steering angle value representing a second one of the steering angle values of a second one of the end-abutting steering angles;

determine whether the variation is less than or equal to a predetermined threshold value;

a relearning unit, implemented by one or more processors, configured to, based on the variation being determined to be less than or equal to the predetermined threshold value, reset the learned terminal position to an initial value, a counting unit, implemented by one or more processors, configured to count a number of times of acquisition of the end-abutting steering angles having ones of variations that are less than or equal to the predetermined threshold value, a first one of the variations being the variation between the first steering angle value and the second steering angle value, wherein based on the number of times of acquisition being determined to be greater than or equal to a first threshold number of times, the relearning unit resets the learned terminal position to the initial value, wherein the counting unit includes a count storage unit configured to:

retain, as a counted number of times of end-abutting, first ones of the number of times counted based on first ones of the variations being determined based on first ones of the end-abutting steering angles being obtained during a first period when a vehicle speed of a vehicle is greater than or equal to a vehicle speed threshold value, retain, as a provisional counted number of times, second ones of the number of times counted based on second ones of the variations being determined based on second ones of the end-abutting steering angles being objected during a second period when the vehicle speed is less than a vehicle speed threshold value, and based on the vehicle speed changing from less than the vehicle speed threshold value to greater than or equal to the vehicle speed threshold value, assign a value of the provisional counted number of times to the counted number of times of end-abutting, and wherein based on the counted number of times of end-abutting being greater than or equal to the first threshold number of times, the relearning unit resets the learned terminal position to an initial value.

2. The turning control device according to claim 1, wherein when occurrence of end-abutting is detected both in a case of steering to a left side and in a case of steering to a right side and each of a first variation in the end-abutting steering angles in the case of steering to the left side and a second variation in the end-abutting steering angles in the case of steering to the right side is less than or equal to the predetermined threshold value, the relearning unit calculates estimated rack stroke, based on the end-abutting steering angles and resets the initial value, based on the estimated rack stroke, one of the first variation and the second variation being the variation between the first steering angle value and the second steering angle value.

3. The turning control device according to claim 1, wherein the end-abutting steering angle range determination unit is further configured to store the end-abutting steering angles and determine the variation as between a stored one of the end-abutting steering angle values and a current steering angle value when occurrence of end-abutting is currently detected, the stored one of the end-abutting steering angles values is the second steering angle value, the current steering angle value is the first steering angle value, and the counting unit is further configured to reset counting of the number of times of acquisition based on the variation being determined not to be less than or equal to the predetermined threshold value.

4. The turning control device according to claim 3, wherein the counting unit is further configured to:

count a number of times that it is determined that both:

a first one of the first steering angle and the second steering angle is closer to a neutral position of the turning mechanism than is a second one of the first steering angle and the second steering angle, and the variation between the first steering angle and the second steering angle is not less than or equal to the predetermined threshold value, and based on determining that the number of times is greater than or equal to a second threshold number of times, reset counting of the number of times.

5. The turning control device according to claim 1, wherein the end-abutting detection unit is further configured to:

based on no end-abutting occurring in a case of steering to one of the left side and the right side and end-abutting occurs in a case of steering to the other of the left side and the right side, calculates a rack stroke, based on the learned terminal position being learned on the one of the left side and the right side and one of the end-abutting steering angles being acquired on the other of the left side and the right side, and based on an error of the calculated rack stroke being determined as not falling within a predetermined allowable range, determine to not use the end-abutting steering angle acquired on the other of the left side and the right side for calculation of variation in the end-abutting steering angles.

6. The turning control device according to claim 1, wherein the end-abutting detection unit is further configured to based on end-abutting being determined as occurring both in a case of steering to the left side and in a case of steering to the right side, calculate rack stroke, based on ones of the end-abutting steering angles acquired in the case of steering to the left side and in the case of steering to the right side, and based on the calculated rack stroke being determined to be less than a predetermined lower limit, assign a value of the counted number of times of end-abutting to the provisional counted number of times and reset a value of the counted number of times of end-abutting to 0.

7. The turning control device according to claim 1 comprising:

a command value calculation unit, implemented by one or more processors, configured to calculate, based on an operation acting on a steering operation unit of a vehicle, a current command value for an actuator providing the turning mechanism with steering assist force;

a command value correction unit, implemented by one or more processors, configured to, when a steered position detected by the position detection unit is in a vicinity of the terminal position learned by the terminal position learning unit, correct the current command value calculated by the command value calculation unit; and a driving unit, implemented by one or more processors, configured to drive-control the actuator, based on the current command value corrected by the command value correction unit.

8. A turning device comprising:

the turning control device according to claim 7; and an actuator configured to, drive-controlled by the turning control device, turn a steered wheel of the vehicle.

9. The turning control device according to claim 1, wherein the variation is a first variation, the steering angle values further comprise a third steering angle value and a fourth steering angle value, the third steering angle value representing a third one of the end-abutting steering angles, the fourth steering angle value representing a fourth one of the end-abutting steering angles, acquiring the end-abutting steering angles comprises acquiring the first one of the steering angle values, as a latest end-abutting steering angle, after acquiring, as stored end-abutting steering angles, each of the second one of the steering angle values, the third one of the steering angle values, and the fourth one of the steering angle values, the end-abutting steering angle range determination unit is further configured to:

determine a maximum value among the stored end-abutting steering angles of the second steering angle value, the third steering angle value, and the fourth steering angle value;

determine a minimum value among the stored end-abutting steering angles of the second steering angle value, the third steering angle value, and the fourth steering angle value;

determine the first variation between the first steering angle value and the second steering angle value as between the first steering angle value and one of the maximum value and the minimum value, the second steering angle value being the one of the maximum value and the minimum value;

determine a second variation between the first steering angle value and an other one of the maximum value and the minimum value, the other one of the maximum value and the minimum value being one of the third steering angle value and the fourth steering angle value; and determine whether both of the first variation and the second variation are each less than or equal to the predetermined threshold value, and the relearning unit is further configured to, based on the both of the first variation and the second variation each being determined to be less than or equal to the predetermined threshold value, reset the learned terminal position to the initial value.

* * * * *